US007676459B2

(12) United States Patent
    Carone et al.

(10) Patent No.: US 7,676,459 B2
(45) Date of Patent: Mar. 9, 2010

(54) METHOD AND SYSTEM FOR CREATING AND MAINTAINING AN INDEX FOR TRACKING FILES RELATING TO PEOPLE

(75) Inventors: Trevor A. Carone, San Francisco, CA (US); Batista Macario Gazoli, Brisbane, CA (US); Matthew Michael Kane, Philadelphia, PA (US); Edgar A. Penaflor, Daly City, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 546 days.

(21) Appl. No.: 11/155,386

(22) Filed: Jun. 17, 2005

(65) Prior Publication Data
    US 2005/0234913 A1      Oct. 20, 2005

Related U.S. Application Data

(63) Continuation of application No. 10/157,596, filed on May 28, 2002, now Pat. No. 6,968,348.

(51) Int. Cl.
    *G06F 17/30*    (2006.01)
    *G06F 7/00*     (2006.01)
(52) U.S. Cl. .................................. 707/4; 707/3; 707/10
(58) Field of Classification Search ...................... 707/3, 707/10
    See application file for complete search history.

(56) References Cited

U.S. PATENT DOCUMENTS

| | | | | |
|---|---|---|---|---|
| 6,141,694 | A * | 10/2000 | Gardner | 709/240 |
| 6,658,412 | B1 * | 12/2003 | Jenkins et al. | 707/5 |
| 6,826,548 | B2 | 11/2004 | Hungerpiller et al. | |
| 7,024,458 | B2 * | 4/2006 | Chan et al. | 709/206 |
| 2002/0091635 | A1 * | 7/2002 | Dilip et al. | 705/39 |
| 2002/0099720 | A1 * | 7/2002 | Bansal | 707/104.1 |

(Continued)

FOREIGN PATENT DOCUMENTS

WO        WO 02/21293 A1      3/2002

OTHER PUBLICATIONS

Chahuri et al. Index merging (Data engineering, 1999. Proceedings., 15 International Conference), Mar. 23-26, 1999, pp. 640-648.

(Continued)

*Primary Examiner*—Baoquoc N To
(74) *Attorney, Agent, or Firm*—Hunton & Williams LLP

(57) ABSTRACT

A computer system creates and maintains an index for tracking information relating to individuals. Such information can include, but is not limited to, social security numbers, names, address information, credit bureau identification numbers, and credit history information on individuals. The invention employs logical rules to this information in order to create and maintain a set of files for each individual. The logical rules can include social security rules, geography rules, and address ranking rules. The invention is designed to evaluate slight variations in information very carefully in order to insure that appropriate files are assigned the same index identification number or that appropriate records are assigned separate and different index identification numbers as a situation warrants. The present invention is designed to maintain numerous files for each individual being tracked instead of merging and purging files as is done in the conventional art.

20 Claims, 15 Drawing Sheets

U.S. PATENT DOCUMENTS

2002/0174073 A1 11/2002 Nordman et al.
2003/0097359 A1* 5/2003 Ruediger .................. 707/6

OTHER PUBLICATIONS

Hernandez et al. The merger/purse problem for large database, (International conference on Management of Data, Proceedings of the 1995 ACM SIGMOD international conference on Management of data), 1995, pp. 127-138.

Business Wire. Pitney Bowes Technology Saves Money by Correc Outdated Addresses and Complying with New Postal Regulations. Sep. 19, 1999, pp. 1-13.

PR Newshire. Organization Profile: Group I Software, Inc. Jan. 16, 2001. pp. 1-7.

* cited by examiner

Exemplary SSN Matching Rules  400

| | | SSN Match |
|---|---|---|
| 405 | S1 | SSN Exact Match<br>First Name Exact Match<br>Last Name Exact Match<br>Address Numeric Exact Match<br>Street Name Exact Match |
| 410 | S2 | SSN Exact Match<br>First Name Exact Match<br>Last Name Exact Match |
| 415 | S3 | SSN Exact Match<br>First Name Exact Match<br>Gender Equals Female<br>or<br>SSN Exact Match<br>First Name Exact Match<br>Gender Equals Female<br>One With Middle Initial / One Without |
| 420 | S4 | SSN Exact Match<br>First Name Exact Match<br>Last Name Exact Match<br>One With Middle Initial / One Without |
| 425 | S5 | SSN Exact Match<br>First Name Exact Match<br>Regardless of Middle Initial<br>Address Numeric Exact Match<br>Street Name Exact Match<br>Don't Compare Second Address Line |
| 430 | S6 | Exact SSN<br>Exact Match on a Flip First and Last Name<br>On First Record, Ignore the Middle Initial<br>Then Process Rules S1 through S5 |

*FIG. 4*

Exemplary Geography Matching Rules

| | Geographical Match | Composite Score | Street Numeric | First Name |
|---|---|---|---|---|
| G1 | Exact SSN Match<br>Compare Generational Suffix—DO NOT Combine<br>If JR. (II or Second) is compared to a SR. | 77 | 30 | 70 |
| G2 | Missing<br>Compare Generational Suffix—Suffix Code Must Equal Jr., Sr. | 85 | 60 | 80 |
| G3 | Different SSN<br>Compare Generational Suffix—Suffix Code Must Be Equal | 90 | 90 | 90 |
| G4 | Exact SSN Match<br>Last Name<br>Street Number | | 100<br>100 | |

Best Address Logic Table

| Order | Deliverable | SSN | NCOA | Bureau Choice (TU, Experian, Equifax) |
|---|---|---|---|---|
| 1 | 1 | Y | Y | Random selection of Bureau |
| 2 | 1 | Y | N | Random selection of Bureau |
| 3 | 1 | N | Y | Random selection of Bureau |
| 4 | 1 | N | N | Random selection of Bureau |
| 5 | 2 | Y | Y | Random selection of Bureau |
| 6 | 2 | Y | N | Random selection of Bureau |
| 7 | 2 | N | Y | Random selection of Bureau |
| 8 | 2 | N | N | Random selection of Bureau |
| 9 | 3 | Y | Y | Random selection of Bureau |
| 10 | 3 | Y | N | Random selection of Bureau |
| 11 | 3 | N | Y | Random selection of Bureau |
| 12 | 3 | N | N | Random selection of Bureau |
| 13 | 4 | Y | Y | Random selection of Bureau |
| 14 | 4 | Y | N | Random selection of Bureau |
| 15 | 4 | N | Y | Random selection of Bureau |
| 16 | 4 | N | N | Random selection of Bureau |
| 17 | 5 | Y | Y | Random selection of Bureau |
| 18 | 5 | Y | N | Random selection of Bureau |
| 19 | 5 | N | Y | Random selection of Bureau |
| 20 | 5 | N | N | Random selection of Bureau |

*FIG. 10*

Deliverable Definitions for Best Address Logic

| Deliverable | Deliverable Definition | Deliverable Code |
|---|---|---|
| 1 | No return mail and most complete address and most complete name and ZIP+4 coded | (SD16 flag off) and (most complete address) and (most complete name) and (ZIP+4 Coded) <br> SD16 flag is off <br> Undeliverable flag is off <br> State code does not begin with "E" <br> Carrier route is not blank <br> ZIP+4 is not zero <br> Gender Code is not "M" or "F" |
| 2 | (Gender Code is something other than male or female) or ZIP+4 is missing | (Gender Code is not "M" or "F") or (ZIP+4 is zero) |
| 3 | Bad address flag from Finalist | Statecode is "E" |
| 4 | Undeliverable flag is on | Undeliverable flag is on |
| 5 | Return mail flag is on | SD16 flag is on |

*FIG. 11*

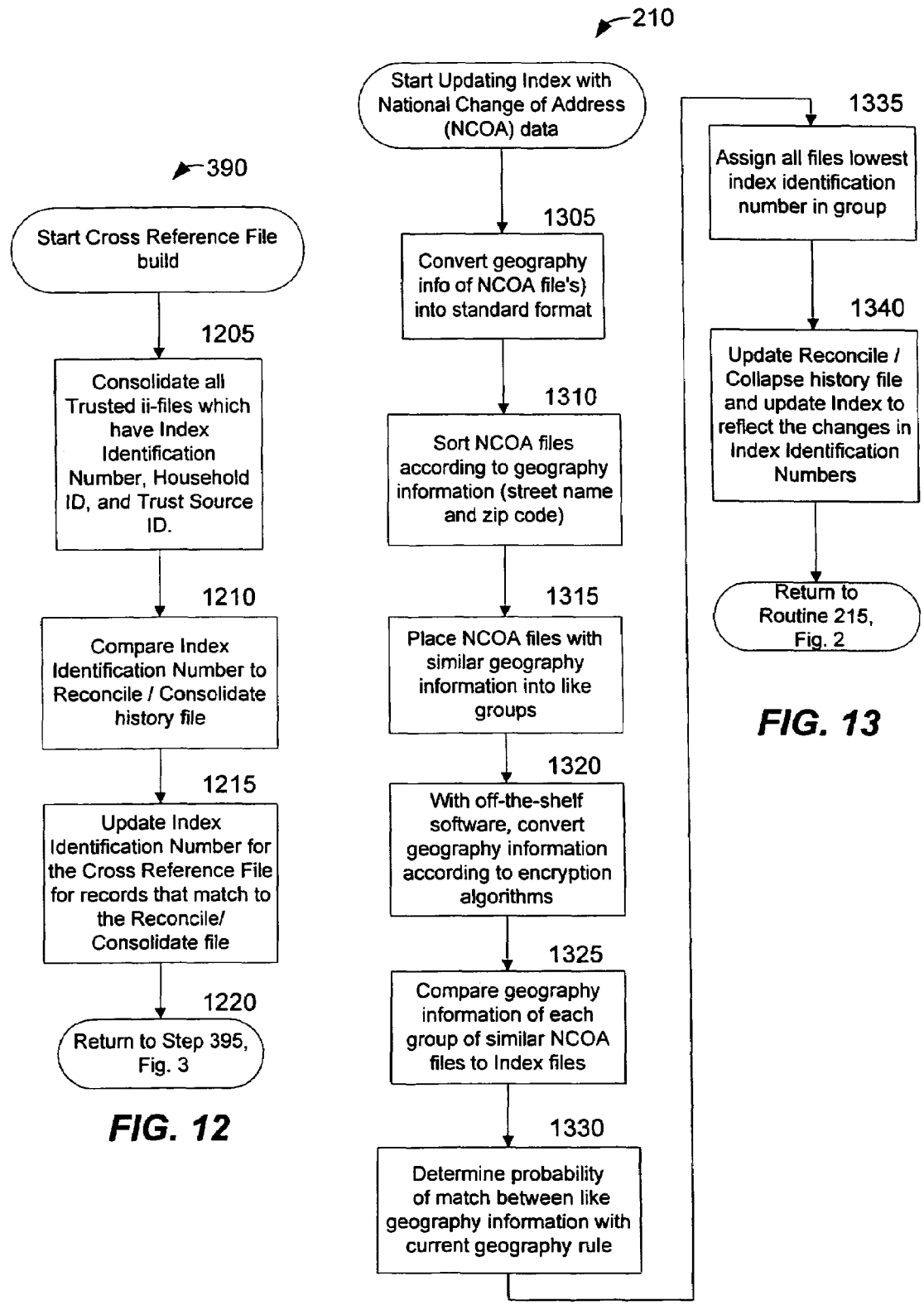

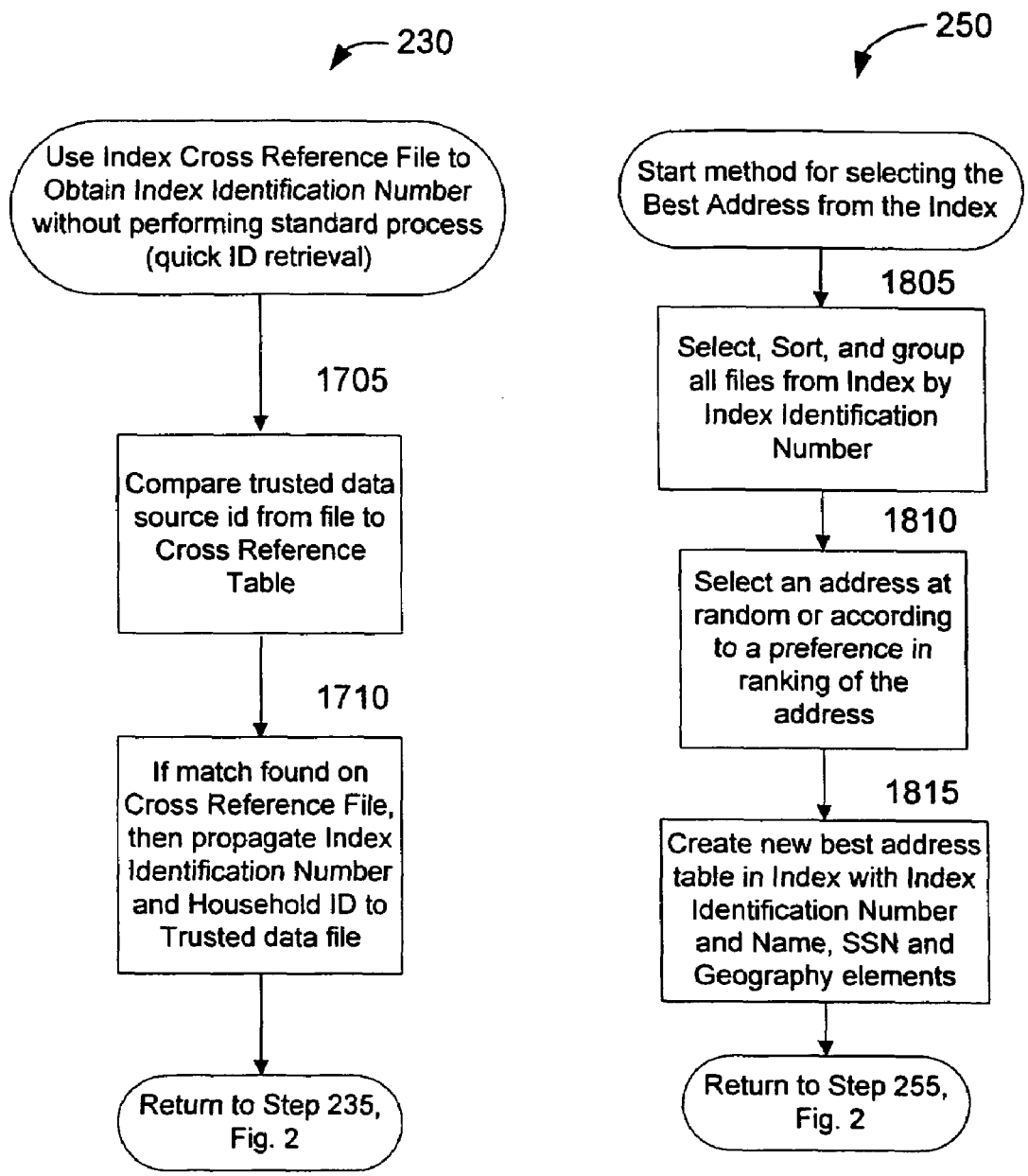

METHOD AND SYSTEM FOR CREATING AND MAINTAINING AN INDEX FOR TRACKING FILES RELATING TO PEOPLE

CROSS REFERENCE TO RELATED APPLICATION

This application is a continuation of and claims priority to U.S. application Ser. No. 10/157,596 filed May 28, 2002, now U.S. Pat. No. 6,968,348 entitled, "Method and System for Creating and Maintaining an Index for Tracking Files Relating to People", the entire contents of which are hereby incorporated by reference.

TECHNICAL FIELD

The present invention relates to computer systems and database management. More particularly, the present invention relates to a method and system for creating and maintaining an index that tracks files comprising various types of information relating to people.

BACKGROUND OF THE INVENTION

Multiple data sources exist in the art of tracking various types of information concerning individuals. For example, credit bureaus have been designed to track the credit history of many individuals that are consumers in commerce. In addition to the credit histories of each individual, the credit bureaus also track the mailing addresses and other contact information for each individual.

Unfortunately, information concerning individuals can change frequently, such as a frequency of a monthly basis. Such changes in information during such a short time span can make it difficult to track the locations and mailing addresses of these individuals. This change of information makes it difficult to track the individuals over time and it makes it difficult to track individuals accurately at the aforementioned intervals such as a monthly basis.

Further, when tracking individual consumers, this leads to enormous amounts of data and that can slow up any processing by a single computer. For example, processing data files comprising 280,000,000 records is not uncommon for credit bureaus. Such a size of records also decreases the speed at which records can be processed.

In addition to the problems associated with amount of data being tracked for a group of individuals, it is well understood in the conventional art that third party data sources other than credit bureaus can contain inaccurate information. Such inaccurate information can be obtained by the third part data sources from consumers who complete voluntary surveys. For example, such information found in third party data sources can include information gathered from warranty registration cards, tickets for raffles, and other like survey acquisition methods.

With inaccurate data, inaccurate linking between files or records within a database can occur. For example, while it is possible to have multiple addresses for one person, it is also possible that more than one person is being tracked by two or more files even though the information, such as addresses, contained within the files appear to indicate that the people associated with these files should be grouped together. On the other extreme is the absence of linking data where two files are intended to track the same individual.

For example, a first credit reporting agency may have new or recent information on new accounts that have been opened by consumer X. Meanwhile, a second credit reporting agency has old data about consumer X. If the information of the first credit reporting agency is not linked with the second credit reporting agency, and if someone relies completely on the data maintained by the second credit reporting agency, then consumer X may receive a business product that would not be suitable for a consumer with a deeper credit history.

While inaccurate linking between files or records within the conventional art poses a significant problem, another problem exists in the art that involves a philosophy of the conventional art and how it perceives two or more files that may be similar but not identical to each other. More specifically, the philosophy of the conventional art considers two files that are similar but not identical as duplicates and often drops one of the perceived duplicates when collecting or combining data.

Such a process is often referred to as a merge/purge process. The merge/purge process of the conventional art is typically performed once and the results from one iteration will usually be different than the results of the second iteration because different data sources are typically used for the second iteration.

In addition to the merge/purge problems in the conventional art, the conventional art utilizes encryption to address the volume of records and the processing power needed to handle the volume. The conventional art typically truncates the information relating to individuals or creates a key for certain fields in order to shorten the amount of characters in a field being processed. This truncation drops data and reduces variation in order to conserve processing power.

While encryption offers some advantages, it is well known that the algorithms involving encryption can become very complex and require expensive computer programmer development time. For systems utilizing an all-encryption environment, the complexities involving encryption can be very cumbersome; meanwhile, performance with such an all-encryption environment may not yield consistent and accurate results. Further, in an all-encryption environment, modifications to rules and programming can be difficult and time consuming.

SUMMARY OF THE INVENTION

The present invention can solve the aforementioned problems by providing a method and system for creating and maintaining an index that tracks files comprising various types of information relating to people. Such information can include, but is not limited to, social security numbers, names, address information, credit bureau identification numbers, and credit history information on individuals.

And more specifically, the address information can include, but is not limited to, first name, last name, street number, street name, city, state, and zip code. For credit history information, such information can include the type of information maintained by a credit bureau or consumer credit reporting agency, such as Equifax of Atlanta, Ga.; Experian of Costa Mesa, Calif.; and TransUnion of Chicago, Ill.

The credit history information can include the following exemplary information: current employer's name, current employer's address, prior employers and their addresses, any bankruptcy history on an individual, the number of credit cards issued to a person, and other like information. The information contained within the files of the index can also include demographic database information that is available for purchase from third party vendors.

The present invention can be designed to collect and maintain multiple files of information for each person that is tracked in the index. Each set or group of files corresponding to a single person is assigned a unique index identification number. The unique index identification number can be sequentially assigned to each individual as the index of files are created and updated. And each file corresponding to one individual is assigned the same index identification number such that all the files for a particular individual can be accessed easily as needed.

Unlike the conventional art which uses a merge/purge process that discards files, the present invention can be designed to create and maintain multiple files on individuals that are consistent and persistent, irrespective of the type of data used to update the index and the frequency at which the index is updated by new data. The index of the present invention can store files on a single individual that may include information that varies slightly from file to file. For example, the present invention can maintain a file of person's formal name as well as file of a person's preferred nick name. As another example, the present invention can maintain files of different addresses for a single person where one file could include a seasonal address and another file could include a permanent address.

Such slight variances of information for a single individual are usually not tracked by the conventional art because the conventional art is designed to merge or combine files of data and to discard the original files. The philosophy of the conventional art considers two files that are similar but not identical as duplicates and drops one of the perceived duplicates. Meanwhile, the present invention usually does not view two files of similar but not identical data as duplicates: the invention perceives them as separate files and can be designed to retain both files. Both files can be assigned the same index identification number in order to create a link or relationship between the files that corresponds to a single individual being tracked.

The present invention can reduce any difficulty in tracking individuals over time where such difficulty can arise when information on an individual changes. The present invention can also reduce any difficulty in tracking individuals accurately at set time intervals such as on a daily, weekly or monthly basis. The present invention typically yields files on an individual that are consistent during the aforementioned set time intervals, unlike the conventional art which employs merge/purge processes that yield inconsistent data for individuals being tracked.

For the present invention, if a change in information for an individual occurs, then files can be updated in a controlled manner. Old data can be saved or archived in case the new information is inaccurate or if it is merely additional information. The old data can also be saved for history purposes such that the evolution of files on an individual can be monitored, if necessary.

To maintain the persistency and consistency of the index, the present invention can apply logical rules to data such as addresses and social security numbers. It can also store multiple addresses for one person. With the present invention, addresses can be ranked according to the results of comparisons with different data such as social security numbers, national change of address (NCOA) data, return address information (deliverability), and the source of the address. The return address information or deliverability information can be derived by tracking return mail that is received after mailing to an address contained in the index. After ranking multiple addresses, a single address can be selected for mailing a business product based on the addresses's ranking.

For example, addresses with the highest rank can be selected as the mailing address for a business product. As another example, an address can be selected by randomly selecting a ranking among multiple addresses or an address can be selected according to a preference with a ranking such as the highest ranking, the lowest ranking, or rankings only different from a previous month. Alternatively, instead of selecting an address by its ranking, an address can be selected according to a random selection of the trusted data source that provided the address to the index.

While the tracking of multiple addresses for an individual can improve the persistency and consistency of the index, the application of logical rules to new data comprising social security numbers (SSNs) also can help improve the persistency and consistency of the index. The present invention can employ rules to social security numbers in order to accurately identify individuals corresponding to the social security numbers. Often social security numbers for individuals can be keyed-in incorrectly or they can be off by one or more digits.

The present invention can include rules to track such inconsistencies in social security numbers in order to prevent the creation or maintenance of separate index identification numbers for data that is really tracking or intended for one individual (and thus, one index identification number). The social security rules of the present invention can be applied in a hierarchical manner meaning that they can be applied in a predetermined order and with a decreasing level in matching criteria.

The application of these rules in this manner can increase the efficiency at which two or more files containing similar but not identical social security numbers (that are tracking a single person) are assigned the same index identification number. The application of these rules in this manner can also separate files having the same index identification number when the files really reflect that two or more individuals are being tracked.

The present invention can also increase the efficiency of assigning files tracking a single individual by applying a set of geographical rules in combination with the social security number rules. Specifically, the geographical rules can be taken from off-the-shelf software products, such as 'SSA Name3' manufactured by Search Software America of Connecticut and can be applied subsequent to the application of the social security number rules. The application of the geography rules after the social security number rules can lesson a need for an exact match with the social security number rules.

The geographical rules can include the calculation and selection of scores relating to a probability of matches between files with different geographical information. The application of the geographical rules can also increase the efficiency at which two or more files containing similar but not identical social security numbers or similar but not identical geographical information (that are tracking a single person) are assigned the same index identification number.

For the geographical logic of the present invention, the selection of the combination of rules and the selection of the scores within the rules can increase the efficiency at which multiple files tracking a single individual are assigned a corresponding index identification number. Meanwhile, for the social security number logic, the actual elements making up the rules and the combination of the rules can increase the efficiency at which multiple files tracking a single individual are assigned a corresponding index identification number.

The aforementioned rules can be applied during the two major processes involved with creating and maintaining the index: a build stage and an update stage. The build stage can involve the creation of the index with one or more trusted data sources. A trusted data source of the present invention can include, but is not limited to, credit bureaus, customer files, United States Post Office 'National Change of Address' Databases, and other like credit reporting agencies or government agencies. Meanwhile, a non-trusted database can include, but is not limited to, commercial demographic databases and other like data sources that have a lesser focus on credit for individuals.

The update stage of the index can be made with either a trusted data source or a non-trusted data source. However, an update to the index originating from a trusted data source usually has different steps than an update to the index originating from a non-trusted data source. For example, if non-trusted data cannot be confirmed by information in the index, this non-trusted data can be dropped. On the other hand, if data from a trusted data source cannot be confirmed by information in the index, the trusted data is saved in the index.

Such distinctions between the ways the types of data sources are handled can increase the accuracy of the files and information contained in the index. The different steps between the respective data sources can enable controlled updates to the files and information contained in the index.

With the index of the present invention, business decisions can be made with ease for individuals being tracked in the database. In other words, the index can allow a determination of whether an individual poses a risk for an offer to a business product. A business product can include, but is not limited to, firm offers of credit such as credit card offers and the like. Other business products can include, but are also not limited to, services, and actual products such as fungible goods. Alternatively, the index can become the foundation for a relational database where various types of information, such as demographic information, can be tracked.

Once it is decided that an individual should receive a business product, the index can generate a best address for the individual. The business product can then be sent to the individual according to this best address.

The index can store a high volume of files, on the order of billions of files comprising multiple fields for each file. Because of this high volume of files, the present invention can be built in either parallel or multi-threaded architectures to maintain speed and serviced levels desired. Specifically, the present invention can be executed in Oracle on a UNIX operating system.

However, the present invention is not limited to these platforms and could be implemented using other widely available platforms. Further, the present invention could be scaled and then implemented on a general purpose computer if dealing with a reduced volume of records. The present invention is also compliant with existing rules and regulations such as the U.S. Federal Truth in Lending Act (TILA) and the U.S. Fair Credit and Reporting Act (FCRA). For example, the present invention can prevent the mixing and matching of addresses and social security numbers. In other words, if a particular social security number of a file is selected for a business decision, then its corresponding address in the same file must be chosen for any mailing.

BRIEF DESCRIPTION OF THE DRAWINGS

FIG. 4 is an exemplary table illustrating the Social Security Number rules according to one exemplary embodiment of the present invention.

FIG. 6 is an exemplary table illustrating the geography matching rules according to one exemplary embodiment of the present invention.

FIG. 10 is an exemplary table illustrating how address data contained in an identification information file is ranked according to best address logic.

FIG. 11 is another exemplary table illustrating the meaning of the "deliverable" status column of the table that is illustrated in FIG. 10.

FIG. 12 is a logic flow diagram illustrating an exemplary subprocess or routine for creating a cross-reference file.

FIG. 13 is a logic flow diagram illustrating an exemplary subprocess for updating the index with national change of address (NCOA) data according to one exemplary embodiment of the present invention.

FIG. 17 is a logic flow diagram illustrating how the cross-reference file of an index is used to obtain an index identification number without performing a standard update process.

FIG. 18 is a logic flow diagram illustrating an exemplary subprocess or routine for selecting a best address from the index.

DETAILED DESCRIPTION OF EXEMPLARY EMBODIMENTS

Figure 1A:
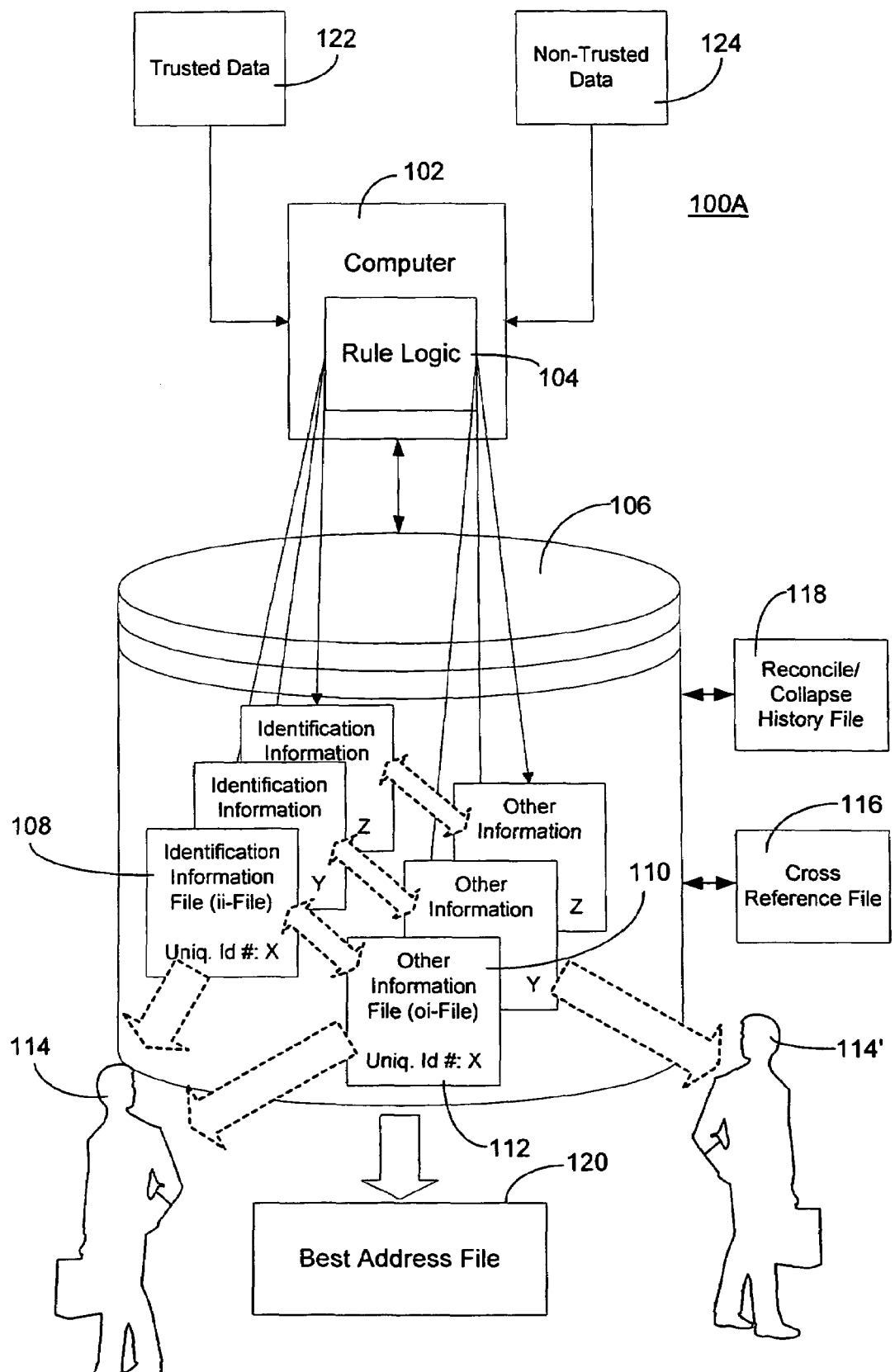
FIG. 1a is a functional block diagram illustrating an exemplary system architecture for the present invention according to one exemplary embodiment.

The present invention may be embodied in program modules that run in a main frame or relational database environment. The present invention can comprise a computer system that can create and maintain an index for tracking information relating to individuals. Such information can include, but is not limited to, social security numbers, names, address information, credit bureau identification numbers, and credit history information on individuals. The invention employs logical rules to this information in order to create and maintain a set of files for each individual. The invention is designed to evaluate slight variations in information very carefully in order to insure that appropriate files are assigned the same index identification number or that appropriate records are assigned separate and different index identification numbers as each situation warrants. The present invention is designed to maintain numerous files for each individual being tracked instead of merging and purging files as is the case in the conventional art.

Although the illustrative embodiments will be generally described in the context of program modules running in a database, those skilled in the art will recognize that the present invention may be implemented in conjunction with operating system programs or with other types of program modules for other types of computers. Furthermore, those skilled in the art will recognize that the present invention may be implemented in either a stand-alone or in a distributed computing environment or both. In a distributed computing environment, program modules may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in specific network architecture with hard-wired logic or programs stored in nonvolatile memory, such as read-only memory.

Referring now to the drawings, in which like numerals represent like elements throughout the several Figures, aspects of the present invention and the illustrative operating environment will be described.

Referring now to FIG. 1A, this Figure is a functional block diagram illustrating exemplary system architecture 100A according to one exemplary embodiment of the present invention. The exemplary system architecture 100A comprises a computer 102 and an index 106. Index 106 can be stored in memory within the computer 102 or it can be part of a separate database that is physically separate but accessible by computer 102. The computer 102 can comprise both a mainframe and a database server. However, other computer hardware that supports the functions performed by computer 102 is not beyond the scope of the present invention.

The computer 102 can execute software modules such as a rules engine 104 that can create and access the files of the index 106. The rules engine 104 can comprise various logical algorithms for sorting and matching files contained within the index 106. The rules engine 104 can comprise various rules such as best address rules, social security rules, and geography rules as will be discussed in further detail below. The rules engine can comprise the best address program, the SSN Sort and Matching program and GEO Sort and Matching program, using THE SSA Names3 software as will be discussed in further detail below.

The index 106 can comprise a database of identification information files (ii-files) 108 and other information files (oi-files) 110. The identification information files 108 can comprise name, address information, and social security number information. And more specifically, the address information can comprise: first name, last name, street number, street name, city, state, and zip code. However, other identification information is not beyond the scope of the present invention. Meanwhile, the other information files 110 can comprise credit history information as well as any other information that could be perceived to give or provide a bias during the matching logic of the present invention. For credit history information, such information can comprise the type of information maintained by a credit bureau or consumer credit reporting agency, such as Equifax of Atlanta, Ga.; Experian of Costa Mesa, Calif.; and TransUnion of Chicago, Ill.

The credit history information can also comprise the following exemplary information: addresses, any bankruptcy history on an individual, the number of credit cards issued to a person, the current balance on existing credit cards, date of birth, previous addresses, public records that can include bankruptcies, liens, judgements, garnishments, secured loans, marital statuses, financial counseling, foreclosures, collection accounts, credit information such as creditor company name, account number, date an account was opened, type of account, high items as of date reported, account status, credit terms, current balance, past due amounts reported, and credit inquiries such as companies that requested a person's credit file. However, other credit history information is not beyond the scope of the present invention. The information contained within the other information files 110 of the index 106 can also comprise demographic database information that is available for purchase from third party vendors.

Both the identification information files 108 and other information files 110 are assigned unique index identification numbers 112. An index identification number 112 comprises a unique number that is typically associated with one individual or person 114. Index identification numbers 112 of the present invention are typically assigned sequentially. This means, if a particular file does not match an existing file in the index 106, then the file is assigned the next sequential index identification number 112 that is available. Also, multiple identification information files 108 as well as multiple other information files 110 can be assigned the same index identification number 112. This usually means that these files having the same index identification number 112 are being used to track a single individual 114.

The index 106 can further comprise history files 118 as well as cross reference files 116. The history files 118 comprise date information of when the unique identification number 112 for a particular identification information file 108 or other information file 110 have been changed. The history file 118 can further track identification numbers 112 that were previously assigned for a particular file.

The cross reference files 116 can comprise an assigned index identification number 112, a trusted data source identification number, a household identification number and the date of the current index identification number assignment. The trusted data source identification number typically comprises a number that is unique to the trusted data source. Keeping track of this trusted data source identification number helps later matching logic as will be discussed below. The trusted source identification number typically includes numbers assigned by credit bureaus to particular files or records associated with a single individual or person.

By manipulating the index 106, the computer 102 can generate a best address file 120. The best address file 120 can comprise addresses with the highest ranking. As another example, best address file 120 can comprise addresses randomly selected according to a ranking among multiple addresses or addresses can be selected according to a preference with a ranking such as the highest ranking, the lowest ranking, or rankings only different from a previous month selection.

To create index 106, the computer 102 can receive and process records from a trusted data source 122. To update the index 106, the computer 102 can receive and process records from the trusted data source 122 as well as a non-trusted data source 124. While it is possible to create the index 106 from a non-trusted data source 124, creating an index 106 in this manner may harm or degrade the accuracy of the files contained within the index 106. Therefore, creating an index 106 from a non-trusted data source 124 is not recommended.

A trusted data source 122 can comprise credit bureaus, customer files, a national change of address database, and other like credit reporting agencies or government agencies. However, other trusted data sources 112 are not beyond the scope of the present invention. A non-trusted database 124 can comprise commercial demographic databases and other like data sources that have a lesser focus on credit for individuals 114.

Figure 1B:
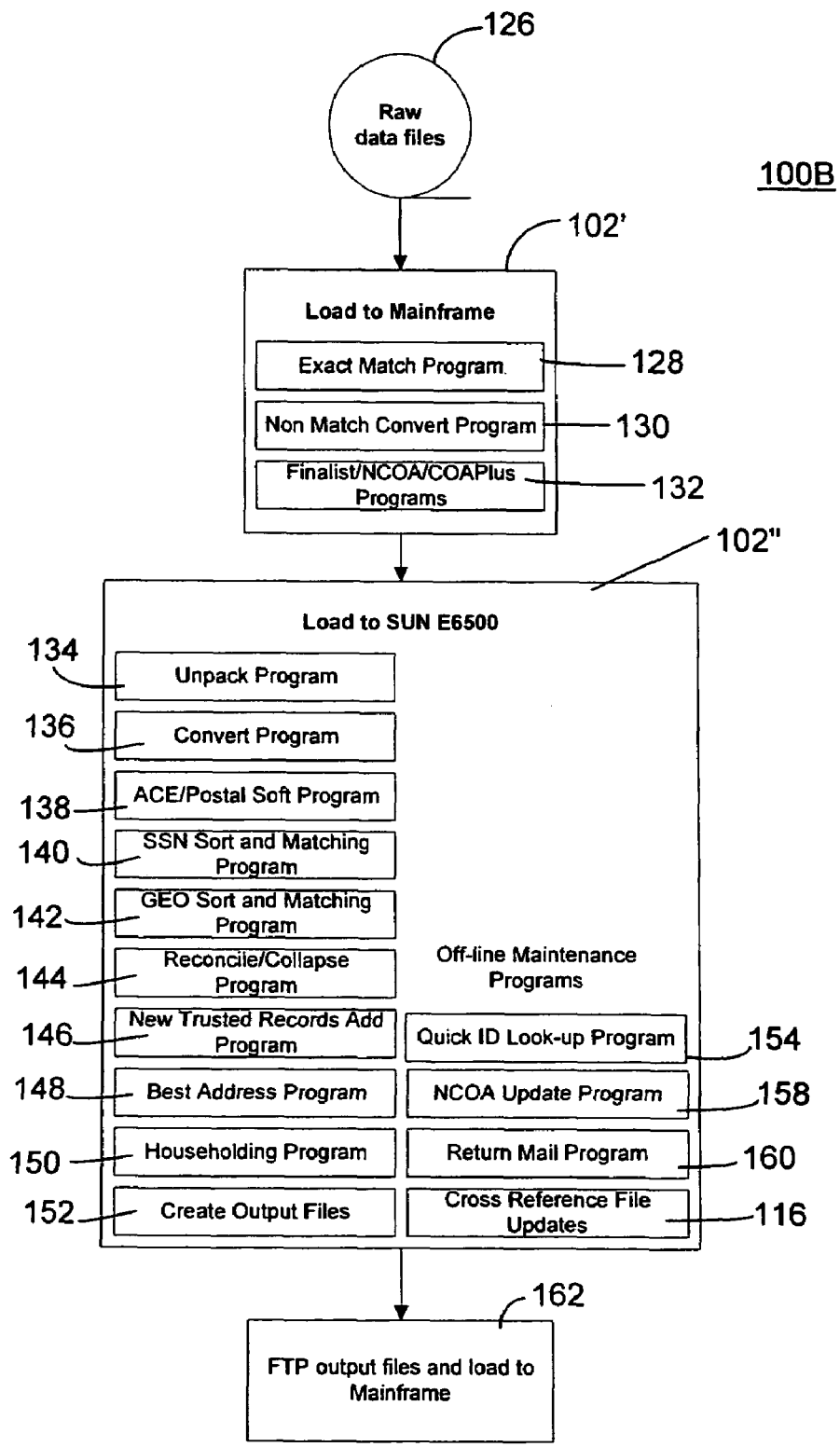
FIG. 1b is a functional block diagram illustrating an exemplary computer and software architecture for the present invention according to one exemplary embodiment.

Referring to FIG. 1B, this figure and its discussion are intended to provide a brief, general description of a suitable computing environment in which the invention may be implemented. This Figure is a block diagram illustrating an exemplary computer and software architecture 100B according to one exemplary embodiment of the present invention.

The exemplary computer and software architecture 100B comprises a first computer 102' and a second computer 102". The first computer 102' can comprise a shared mainframe computer such as anyone of IBM 2065, IBM 9672, IBM 9021, and HDS SKYLINE shared mainframes known in the art. However, those skilled in the art will appreciate that other computers are not beyond the scope of the present invention. The first computer 102' can execute an exact match program to identify files that match exactly to the INDEX 128 as well run convert 130 and address hygiene (Finalist/NCOA/COA-plus) programs 132 on files that didn't match the INDEX (Non-Match Programs)

The second computer 102" can comprise a SUN E6500 Server computer. However, those skilled in the art will appreciate that other computers are not beyond the scope of the present invention.

The second computer 102" can execute the following programs: A UNIX unpackit program 134 which can unpack binary fields, remove non printable characters, remove blank fields, and change EBCIDIC text to ASCII, a convert program 136; which can transform the identifying information file (ii-File) into a similar layout and append the necessary identifiers used in the SSN and GEO sort and Matching Programs, an ACE/POSTAL soft program 138 which provides hygiene and deliverability codes to each file as well as postal certification used by bulk mailers to obtain discounts from the United States Post Office, a SSN Sort and Matching Program 140, a GEO Sort and Matching Program 142, a convert/Match/collapse program 144, a new records add program 146, a best address program 148, a householding program 150 which can identify files belonging to individuals in the same household, can also create output files 152 which can be a series of lookup tables or maintenance tables such as; NCOA prep files, Collapse ID historical tables and new ID tables, an update date program 154; which can add the newest date an existing file in the index has been obtained from a trusted source, an NCOA update Program 158; which can add the newest address changes for files using the United States Postal Service's national change of address file, and an Return Mail program 160; which can use information returned back from the USPS about name and addresses that are undeliverable and flag those records in the INDEX, and cross reference files 116 (also illustrated in FIG. 1A); which allows the individual id to be propagated (appended) to the other information (oi-File) files.

Further details of each of these programs will be explained below with respect to the flow charts of the later Figures.

The second computer 102" can generate file transfer protocol (FTP) output files 162 comprising addresses for individuals that should receive firm offers of credit that can then be resubmitted back to the first computer 102' for further processing.

Computer-Implemented Process for Creating and Maintaining an Index

The present invention includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the program flow.

Figure 2:
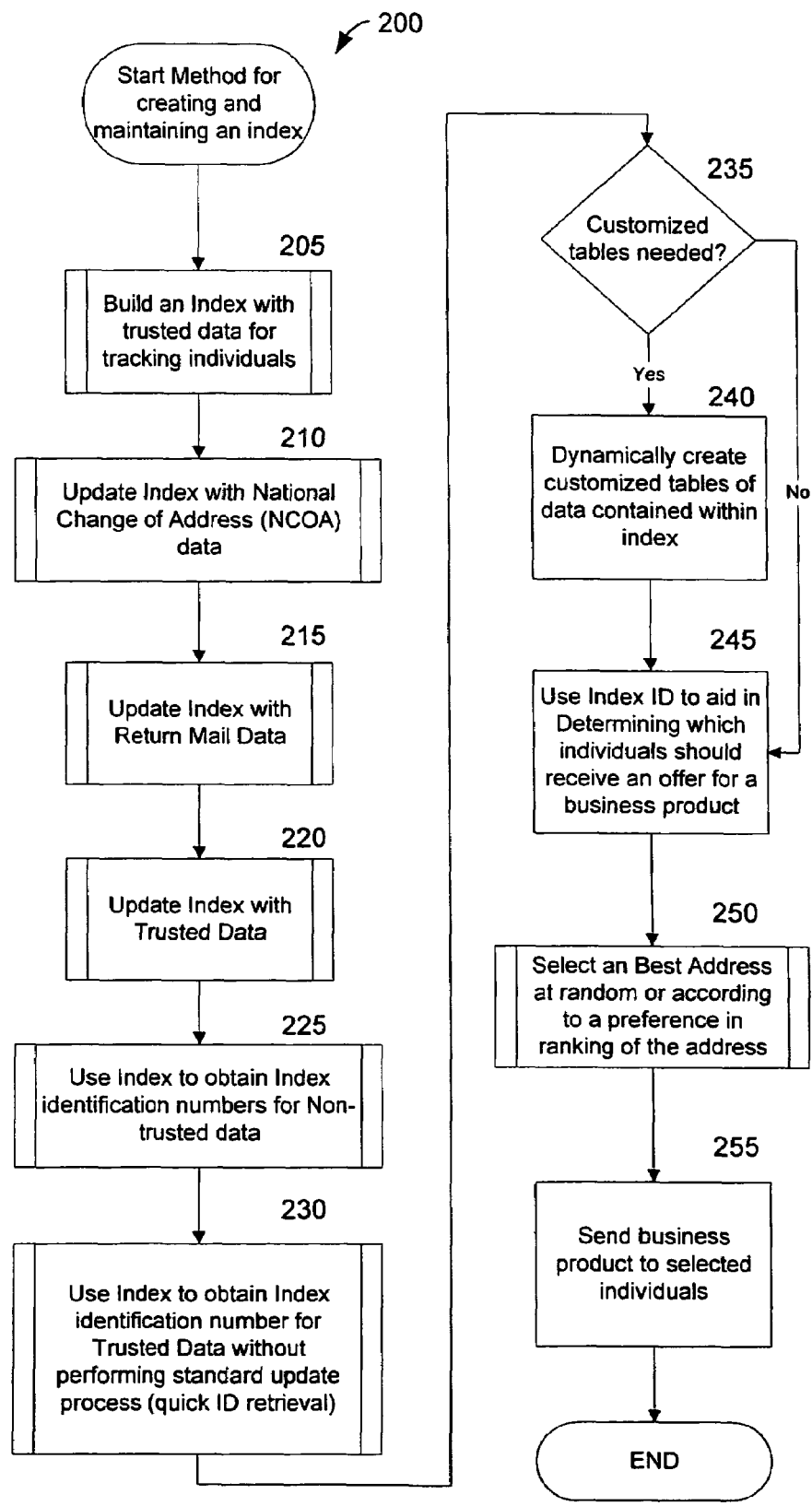
FIG. 2 is a logic flow diagram illustrating an exemplary embodiment of a method for creating and maintaining an index.

Referring now to FIG. 2, this Figure illustrates an exemplary logic flow diagram of a computer-implemented process for creating and maintaining an index 106. More specifically, the logic flow diagram illustrated in FIG. 2 illustrates a computer-implemented process for creating and maintaining an index 106 that receives information from multiple data sources. The logic flow described in FIG. 2 is the core logic of the top-level processing loop of the computer system, and as such is executed repeatedly.

It is noted that the logic flow diagram illustrated in FIG. 2 can illustrate a process that occurs after initialization of several of the software components. That is, in the exemplary programming architecture of the present invention, several of the software components or software objects that are required to perform the steps illustrated in FIG. 2 can be initialized or created prior to the process described by FIG. 2. Therefore, one of ordinary skill in the art recognizes that several steps pertaining to initialization of the software objects may not be illustrated.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

The method 200 for creating and maintaining an index 106 of FIG. 2 starts with routine 205 in which an index 106 is built with trusted data for tracking individuals. Further details of routine 205 will be discussed below with respect to FIGS. 3-7.

Next, in routine 210, the index 106 is updated with national change of address (NCOA) data. This routine can be performed by the NCOA update program 158, illustrated in FIG. 1B. Further details of routine 210 will be discussed below with respect to FIG. 13. Next, in routine 215, the index 106 can be updated with return mail data. This routine can be performed by the return-mail program 160 illustrated in FIG. 1B. In this routine, files comprising addresses of returned mail are stored in the index 106.

Specifically, each return mail file is compared to each file in the index 106. If a return mail file matches a file already stored in index 106, the existing file in the index is flagged as undeliverable. Accordingly, if a return mail file does not match an existing file already present in the index 106, then the return mail file is assigned the next sequential index identification number 112 and is stored in the index 106. Further details of routine 215 will be discussed below with respect to FIG. 14. It is noted that a database of files comprising return mail can be easily created when first class mail is used to transfer messages or articles to individuals who could become potential customers. First class mail is typically returned by the United States Postal Service to the sender if the addressee cannot be found or located.

Next, in routine 220, the index 106 can be updated with trusted data. Further details of routine 220 will be discussed below with respect to FIG. 15. In routine 225, the index 106 can be used to obtain index identification numbers for non-trusted data. Other details of routine 225 will be discussed below with respect to FIG. 16.

In routine 230, the index can be used to obtain or identify index identification numbers for trusted data without performing the standard update process. Routine 230 can be performed by the quick ID look-up program 154, as illustrated in FIG. 1B. Further details of routine 230 will be discussed below with respect to FIG. 13. Routine 230 can be performed by the new records add program 146, illustrated in FIG. 1B. Further details of routine 230 will be discussed below with respect to FIG. 17.

In decision step 235, it is determined whether customized tables of information derived from the index 106 are needed. If the inquiry to decision step 235 is positive, then the "yes" branch is followed to step 240 in which customized tables of data contained within the index 106 can be dynamically created.

If the inquiry to decision step 235 is negative, then the "no" branch is followed to step 245, in which it is determined which individuals should receive an offer for a business product. As noted above, a business product for the present invention can comprise firm offers of credit, such as credit card offers and the like. Other business products can comprise, but are not limited to, services and actual products, such as fungible goods.

Next, in routine 250, an address can be selected at random or according to preference in ranking of the address stored for particular index identification number 112. In this routine, one or more address files associated with the unique identification number 112 can be randomly selected. Specifically, a ranking can be randomly selected and the particular identification information file associated with an individual having the ranking is used as the address. If not selecting at random, addresses associated for each unique index identification number 112 can be selected according to a lowest ranking, where the ranking is defined according to a best address logic table as illustrated in FIGS. 10 and 11 and as will be discussed in further detail below. Further details of routine 250 will be discussed below with respect to the description of FIG. 18.

In step 255, the business product can be sent to selected individuals that are approved according to preset criteria.

Figure 3:
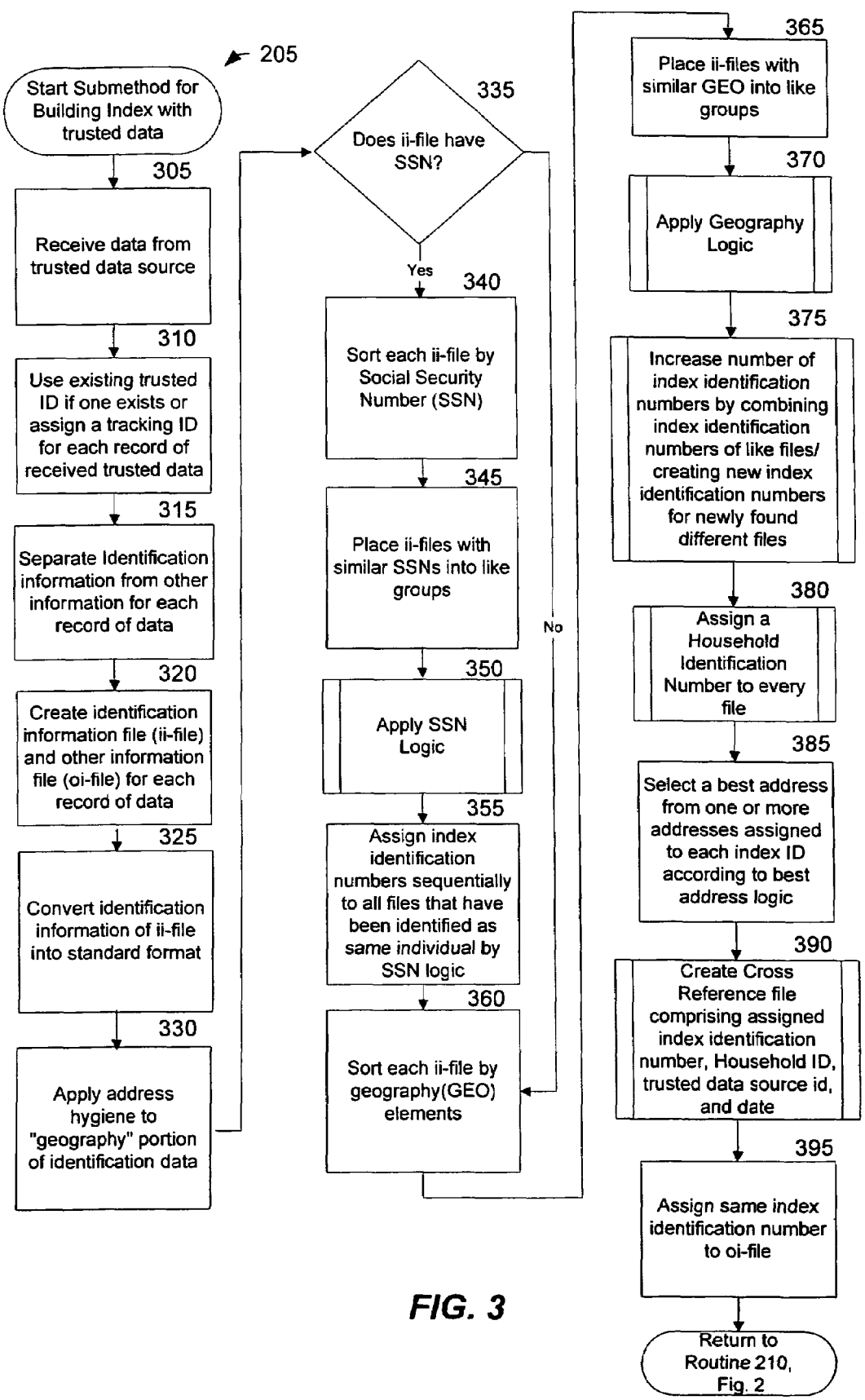
FIG. 3 is a logic flow diagram illustrating an exemplary subprocess or routine of FIG. 2 for building an index with trusted data according to one exemplary embodiment.

Referring now to FIG. 3, this figure illustrates the exemplary routine or submethod 205 for building the index 106 with trusted data. Step 305 is the first step of routine 205, in which data is received from a trusted data source.

In step 310, a trusted data source ID from each record of data is ascertained. It is common for a trusted data source to assign its own identification numbers for files that it offers for sale or shares with other parties. The trusted data source identification number is typically a number assigned by the trusted data source, such as a credit bureau or credit reporting agency like Equifax, Experian and TransUnion.

Next, in step 315, identification information is separated from the other information for each record of trusted data received from the trusted data source. In step 320, an identification information file (ii-file) and other information files (oi-file) are created for each record of data received from the trusted data source.

In step 325 the identification information of the ii-file is converted into a standardized format. More specifically, the name and social security number of the identification information are converted to match the format used in the index of the present invention. For example, often some databases will have spaces between social security numbers or dashes between groups of characters in the number. This step converts the received information into the format used in the index 106.

Similar to step 325, in step 330, hygiene is applied to the geography information of the ii-file. Specifically, geography information contained within the identification information file is converted into a standardized format. In other words, the geography information of the identification information is converted to match the format used in the index of the present invention. For example, often the word "street" will be abbreviated in other databases. For the index of the present invention, in one exemplary embodiment, it is preferred that the word "street" is typed out completely.

In decision step 335, it is determined whether the current identification information file has a Social Security Number. If the inquiry to decision step 335 is positive, then the "yes" branch is followed to step 340, in which each identification information file is sorted by its Social Security Number. If the inquiry to decision step 335 is negative, then the "no" branch is followed to step 360, in which each identification information file is sorted by its geography elements.

In step 345, the identification information files having similar Social Security Numbers are placed into like groups. Next, in routine 350, Social Security Number logic (comprising a set of Social Security Number rules) is applied to the current group of identification information files being evaluated. Further details of routine 350 will be discussed below with respect to FIG. 5. Routine 350 can be performed by the SSN Sort and matching program 140, illustrated in FIG. 1B.

In step 355, index identification numbers are assigned sequentially to all files that have been identified as the same individual by the Social Security Number logic. In step 360, as discussed above, each identification information file is sorted according to geography information. Geography information can comprise street names, zip codes, and other like information.

In step 365, the identification information files sorted according geography can be placed into like groups. Subsequently, in routine 370, geography logic (comprising a set of geography rules) is applied to the current group of files being evaluated. Further details of routine 370 will be discussed below with respect to FIGS. 6 and 7. Routine 370 can be performed by the GEO Sort and matching program 142, illustrated in FIG. 1B.

Next, in routine 375, the number of identification numbers is increased by propagating the index identification number 112 of like files and assigning new index identification numbers to new files without matches to the Index. Details of routine 375 will be discussed below with respect to FIG. 8. Routine 375 can be performed by the reconciled/collapse program 144, illustrated in FIG. 1B.

In routine 380, a household identification number is assigned to each identification information file. Further details of routine 380 will be discussed below with respect to FIG. 9. Routine 380 can be performed by the householding program 150, illustrated in FIG. 1B.

In step 385, the address data contained in the identification information file is ranked according to a best address logic table that is illustrated in FIG. 10. Step 385 can be performed by the best address program 148, illustrated in FIG. 1B.

Referring now briefly to FIG. 10, this figure illustrates a table 1000 that comprises a ranking system for the best address program 148. The first column 1005 lists the 20 possible rankings that a particular address of a file can receive. The second column 1010 lists the deliverability as defined by the deliverability table 1100 as illustrated in FIG. 11.

Referring now briefly to FIG. 11, this figure illustrates a deliverability definitions table 1100. It defines the codes for deliverability as listed in the first column 1005 of table 1000. The second column 1110 lists the conditions needed to define the deliverability status listed in the first column 1105. The third column 1115 lists exemplary code that could be used on a computer system.

To achieve a deliverability status of "one", a particular file being evaluated must not contain any return mail and must be the most complete address, most complete name, and most complete zip code.

To achieve a deliverability status of "two", the gender code of a particular file is something other than male or female or possibly the zip code is missing.

To achieve a deliverability status of "three", the file must comprise a bad address flag. For example, a file can be labeled with a bad address flag if there are missing geography components or an address of a person is not recognized by the address hygiene software. To achieve a deliverability status of "four", the address must be indicated as undeliverable.

To achieve a deliverability status of "five", the current address must be indicated as one in which mail was returned.

Referring back to FIG. 10, the third column 1015 indicates whether a particular file being evaluated has a Social Security number. The fourth column 1020 indicates whether the current address being evaluated has been uncovered in the national change of address section of the current index. The fifth column 1025 indicates the source of the address.

Referring now back to FIG. 3, in routine 390, a cross-reference file comprising assigned index identification numbers, trusted data source ID, and date is created. Further details of routine 390 will be discussed below with respect to FIG. 12. Routine 390 can be performed by the cross-reference file update program 116 illustrated in FIG. 1B.

In step 395, the same index identification number 112 of an identification information file is assigned to its corresponding other information file. The process then returns to routine 210 of FIG. 2.

Referring now to FIG. 4, this figure illustrates a table 400 that lists several exemplary rules for matching Social Security numbers of the present invention. The present invention is not limited to each of these rules (the elements that make up each rule) or the combination of these particular rules. Other rules and other combinations of rules are not beyond the scope of the present invention. However, it is noted that the particular rules listed in table 400 appear to yield the best results at the time of this writing of the description.

The first rule in the first row 405 requires an exact match for the following fields of the group of files being evaluated: the Social Security number, the first name, last name, the address numeric, and street name. If the data within the fields of the files being evaluated match up, then it is likely that the files correspond to a single index identification number 112 or individual or person.

The second rule of the second row 410 requires the exact match of the following fields: Social Security number, first name, and last name. For the third rule of the third row 415, the Social Security number must be an exact match as well as the first name. And the gender must equate or indicate "female." Alternatively, for the third rule in the third row 415, the Social Security number must be an exact match as well as the first name. And the gender can equal a female and the first name has middle initial or does not have middle initial. Therefore, this third social security number rule can detect women who are married and who may have changed their last or middle name to reflect their new marital status.

In the fourth row 420 of table 400, the following fields must be an exact match: Social Security number, first name, and last name. The first name must further have one middle initial or be absent of a middle initial.

Referring to the fifth row 425 of the table 400, the following fields must comprise an exact match: Social Security number, first name regardless of middle initial, address numeric, street name. Regarding the fifth row 430 of table 400, the following fields should be exact: Social Security number and a foot of a first and last name on the first record. Meanwhile the middle initial, if any, is ignored.

Figure 5:
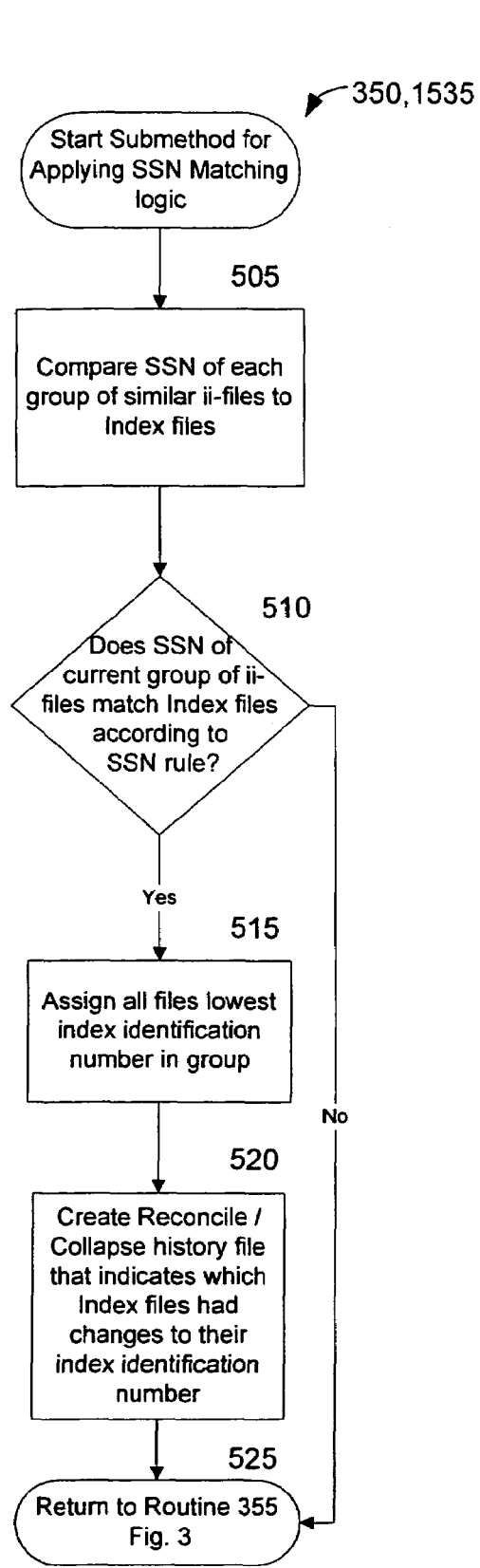
FIG. 5 is a logic flow diagram illustrating an exemplary subprocess or routine for applying Social Security Number matching logic illustrated in FIG. 4 according to one exemplary embodiment.

Referring now to FIG. 5, this figure illustrates an exemplary submethod 350 for applying Social Security Number matching logic. Step 505 is the first step in the submethod where the Social Security Number of each group of similar identification information files is compared to the current Social Security Number rule. The Social Security Number rules have been described above with respect to FIG. 4.

In decision step 510, it is determined whether the Social Security Numbers of the current group matches one another according to the current Social Security Number rule being employed. If the inquiry to decision step 510 is negative, then the "no" branch is followed to step 525. If the inquiry to decision step 510 is positive, then the "yes" branch is followed to step 515, in which the identification information files matching the current rule are assigned with the lowest index identification number of corresponding index identification file within the group being evaluated that has matched the current social security rule.

In step 520, a Reconcile/Collapse history file is created from the process and can be used in routine 800 to update the Index to indicate which index files had changes made to their index identification number 112 because of matches between files and their social security numbers. The Reconcile/Collapse history file 118 allows the index 106 to track the evolution of files contained within the index 106. In step 525, the process returns to routine 355 of FIG. 3.

Referring now to FIG. 6, this figure illustrates an exemplary table 600 that comprises exemplary geography matching rules and exemplary corresponding confidence levels. The present invention is not limited to the combination of these particular rules or the selected confidence levels illustrated. Other rules and other combinations of confidence levels are not beyond the scope of the present invention. However, it is noted that the particular rules listed in table 600 and their chosen confidence levels appear to yield the best results at the time of this writing of the description.

The first row 605 of table 600 sets forth the first rule that requires a confidence level of a predetermined number for an exact match. An exact match according to the first geography rule is said to occur when the composite score of a comparison between two or more records is a score of seventy-seven. Further, the street numeric must have a match score of thirty while the first name field must have a match score of seventy. However, the first rule of the first row 605 requires that matching should not occur when there is a presence of "JR" to denote a junior and a "SR" to note a senior. In such a situation, two individuals are being tracked and therefore, separate, unique index identification numbers 112 should be maintained for these two different individuals.

As noted above, the rules illustrated in table 600 can be selected from rules provided by an off-the-shelf product, such as SSA software. Further, the composite score, street numeric score, and first name score are also options that can be selected from the off-the-shelf software. For the present invention, it was found that the selection of these particular rules from the software as well as the adjustments to a predetermined score yield the most efficient geography matching between records in the index 106.

Referring now to the second row 610, the generational suffixes between the various addresses must be equal. Referring to the third row 615 of table 600, the identification information files being evaluated can have different Social Security numbers; however, the composite matching score must be ninety while the street numeric and first name must be a score of ninety.

Referring to the fourth row 620 of table 600, the Social Security numbers between two or more records need to be an exact match while the last name and street number need a composite score of one-hundred in order to be deemed as matching files.

Figure 7:
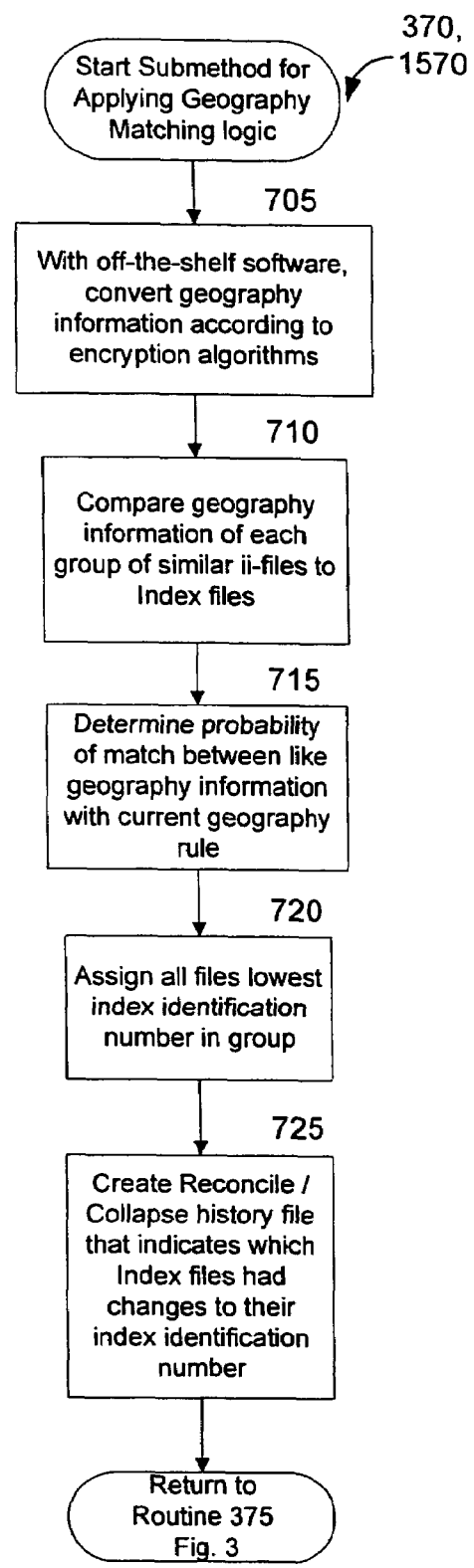
FIG. 7 is a logic flow diagram illustrating an exemplary subprocess for applying geography matching logic according to one exemplary embodiment.

Referring now to FIG. 7, this figure illustrates a submethod or routine 370 of FIG. 3 for applying geography matching logic to the identification information files grouped according to similar geography information. Submethod or routine 370 starts with step 705, in which the geography information is converted with off-the-shelf software according to encryption algorithms. In step 710, the geography information of each group of a similar identification information files is compared to the current geography rule being employed.

In step 715, the probability of match between like geography information of a current group of identification information files with the most recently evaluated geography rule is determined. In step 720, identification information files matching the geography rule according to predefined confidence in the rule are assigned the lowest index identification number 112 of an index identification file contained in the group being evaluated that has matched the rule.

In step 725, a Reconcile/Collapse history file is created from the process and can be used in routine 800 to update the Index to indicate which index files had changes made to their index identification number 112 because of matches between files and their geography information. The Reconcile/Collapse history file 118 allows the index 106 to track the evolution of files contained within the index 106. The process then returns to routine 375 of FIG. 3.

Figures 8, 9:
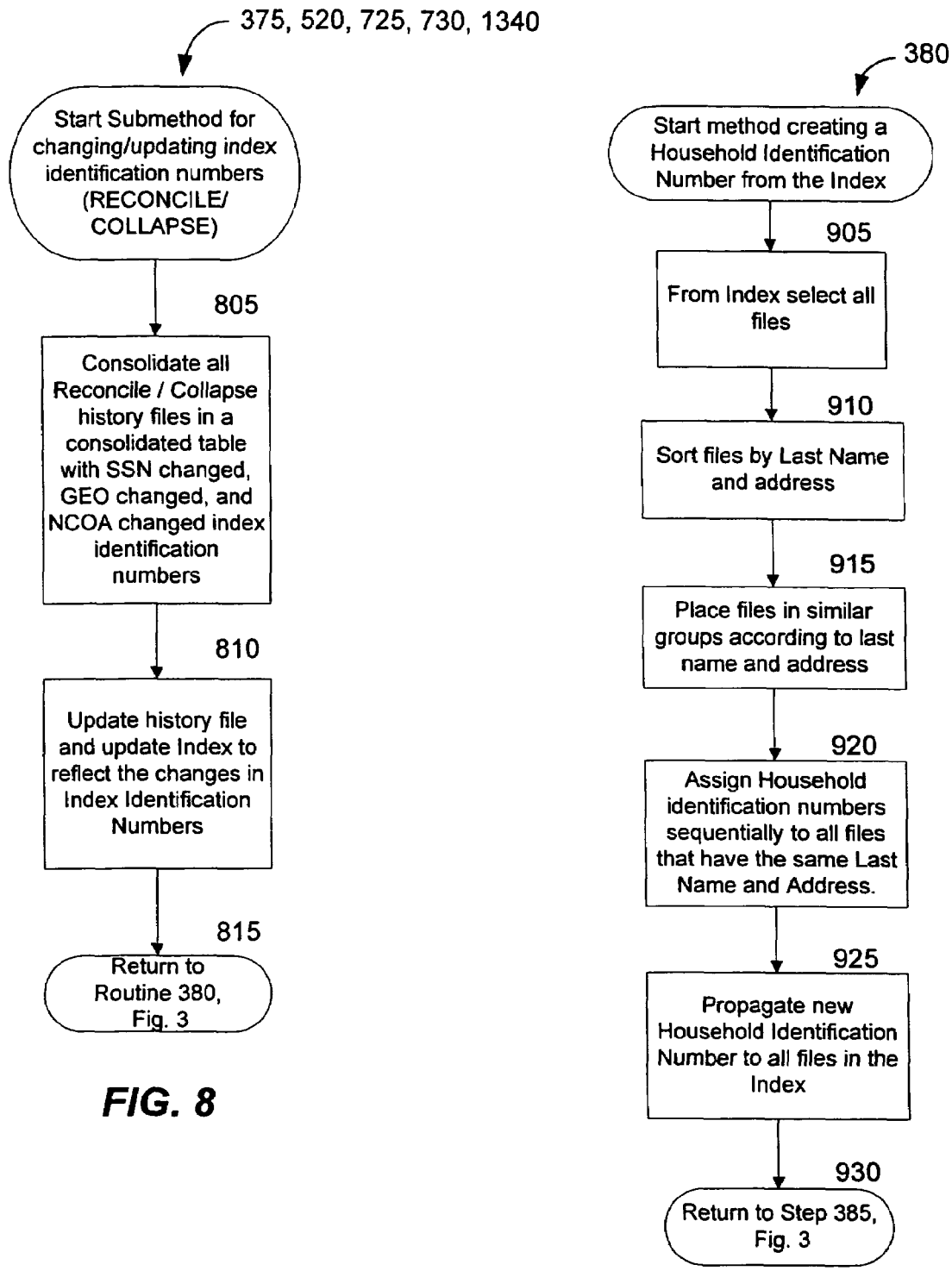
FIG. 8 is a logic flow diagram illustrating an exemplary routine for reconciling and collapsing index identification numbers in order to associate similar identification information files or un-associate/un-link different identification files that were previously linked according to one exemplary embodiment of the present invention.
FIG. 9 is a logic flow diagram illustrating an exemplary subprocess or routine for creating a household identification number from the index according to one exemplary embodiment of the present invention.

Referring now to FIG. 8, this figure illustrates an exemplary submethod 375, 520, 725, 730, and 1340 for reconciling/collapsing index identification numbers 112.

The first step in the submethod is step 805, which can decide what decision path to take. If the decision is to go to step 810, step 810 creates a table of changed index identification numbers associated with the SSN sort matching subprocess. The result of step 810 is a table, step 815, which can be stored for later use. If the decision is to go to step 825, a temporary table is created that contains all of the SSN sort, GEO sort and NCOA files which had index identification numbers changed. In step 830 the table is consolidated and can contain Old SSN index identification number, New SSN index identification number, Old GEO index identification number, New GEO index identification number. In step 835, the new table can then be used to update the Index and various history files. Next, in step 815, the process returns to routine 380 of FIG. 3.

Referring now to FIG. 9, this figure illustrates a submethod or routine 380 for creating a household identification number from the index 106. Submethod or routine 380 can be performed by the householding program 150, illustrated in FIG. 1B. Submethod or routine 380 starts with step 905, in which all of the identification information files are selected from the index 106. Next, in step 910, the identification information files are sorted by last name and address. Next, in step 915, like or similar files are placed in groups.

In step 920, household identification numbers are assigned sequentially to all files that have the same last name and address. By assigning a Household identification number to each file, one can use that data from across related individuals to aid in qualifying for business products and services.

In step 925, the new household identification numbers are propagated (appended) to all corresponding files in the index 106. The household identification numbers can then be used in both the Cross Reference routine 230 and Best Address routine 250. In step 930, the process returns to step 385 of FIG. 3.

Referring now to FIG. 12, this figure illustrates a submethod or routine 390 of FIG. 3 for creating the cross-reference file 116. Submethod or routine 390 starts with step 1205, in which all files from trusted identification information files, which have an index identification number, household identification numbers and a trusted data source identification number are consolidated.

Next, in step 1210, each index identification number 112 is compared to the index identification numbers 112 stored in the reconcile/collapse history file 118. If a match is found the index identification number on the Cross Reference file is updated in step 1215. The Cross Reference file is then available for use in the Quick Update process routine 1700. In step 1220, the process returns to step 395 of FIG. 3.

Referring now to FIG. 13, this figure illustrates a submethod 210 for updating the index 106 with national change of address (NCOA) data. NCOA data is information provided by the Postal Service when individuals complete change of address forms. The NCOA data can be supplied to the index 106 on a monthly basis in order to ensure that the index 106 comprises the most recent address information for individuals. Submethod 210 can be performed by the NCOA update program 158, as illustrated in FIG. 1B.

The submethod 210 for updating the index 106 with the NCOA data starts with step 1305. In step 1305, the geography information of the NCOA data is converted into a standard format that is compatible with the geography information contained within the index 106. Next, in step 1310, the NCOA files are sorted according to the geography information such as street names and zip codes.

In step 1315, the NCOA files with similar geography information are placed into like groups. In step 1320, with off-the-shelf software, the geography information is converted according to encryption algorithms. In step 1325, the geography information of similar NCOA files is compared to the identification information files of the index 106.

In step 1330, a probability of a match between like geography information of a current group with files in the index is calculated based on the geography logic. In other words, the geography rules as illustrated in FIG. 6 are employed.

In step 1335, all the files matching the geography rule for the current group being evaluated are assigned the lowest index identification number 112 of the group. In other words, the NCOA files that match the current rule according to predefined confidence levels associated with the rule are assigned with a lowest index identification number 112 of a matching identification information file in the group of files being evaluated. Next, in step 1340, the history file 118 and the index 106 are updated to reflect the changes in index identification numbers 112. The process then returns to routine 215 of FIG. 2.

Figure 14:
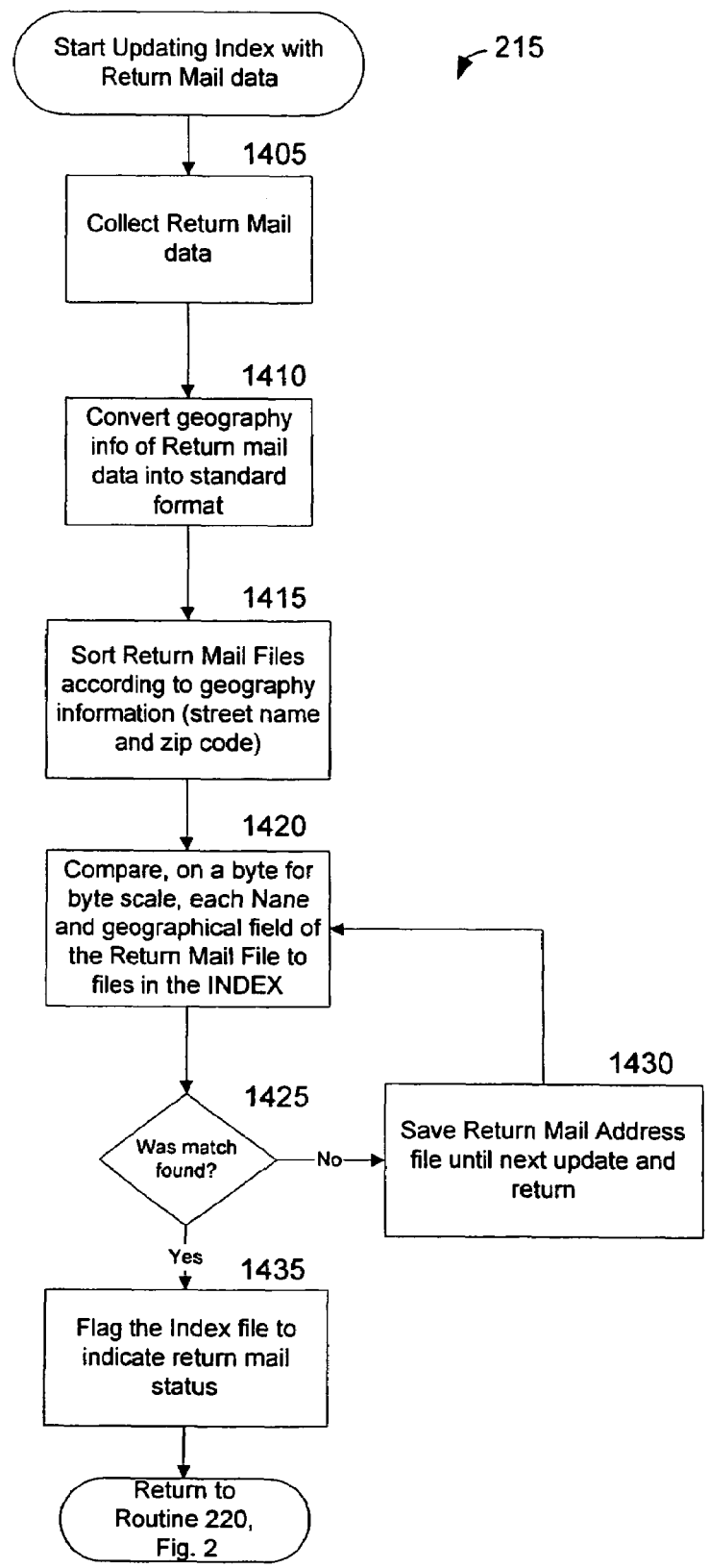
FIG. 14 is a logic flow diagram illustrating an exemplary subprocess for updating the index with return mail data according to one exemplary embodiment of the present invention.

Referring now to FIG. 14, this figure illustrates an exemplary submethod for updating the index 106 with return mail data. The routine 215 for updating the index 106 with return mail data starts with step 1405 in which return mail data is collected. It is noted that a database of files comprising return mail can be easily created when first-class mail is used to transfer messages or articles to individuals who could become potential consumers. First-class mail is typically returned by the United States Postal Service to the sender if the addressee cannot be found or located.

In step 1410, the geography information of the return mail data is converted into a standard format that is compatible with the geography information that is present in the identification information files of the index 106. In step 1415, the Return Mail files of the index 106 are sorted according to geography information such as street name and zip code.

In step 1420, each name and geographical field of the return mail data is compared on a byte-for-byte scale to the identification information files in the index 106. In decision step 1425, it is determined if there is a match found between the return mail data and the identification information files in the index 106.

If the inquiry to decision step 1425 is negative, then the "no" branch is followed to step 1430, in which the return mail address is saved without any index identification number until another update process is executed. The process then returns to step 1420.

If the inquiry to decision step 1425 is positive, then the "yes" branch is followed to step 1435, in which the identification information file of the index 106 is marked or flagged to indicate that the current address on file for the particular individual has a return mail status. The process then returns to routine 220 of FIG. 2.

Figure 15:
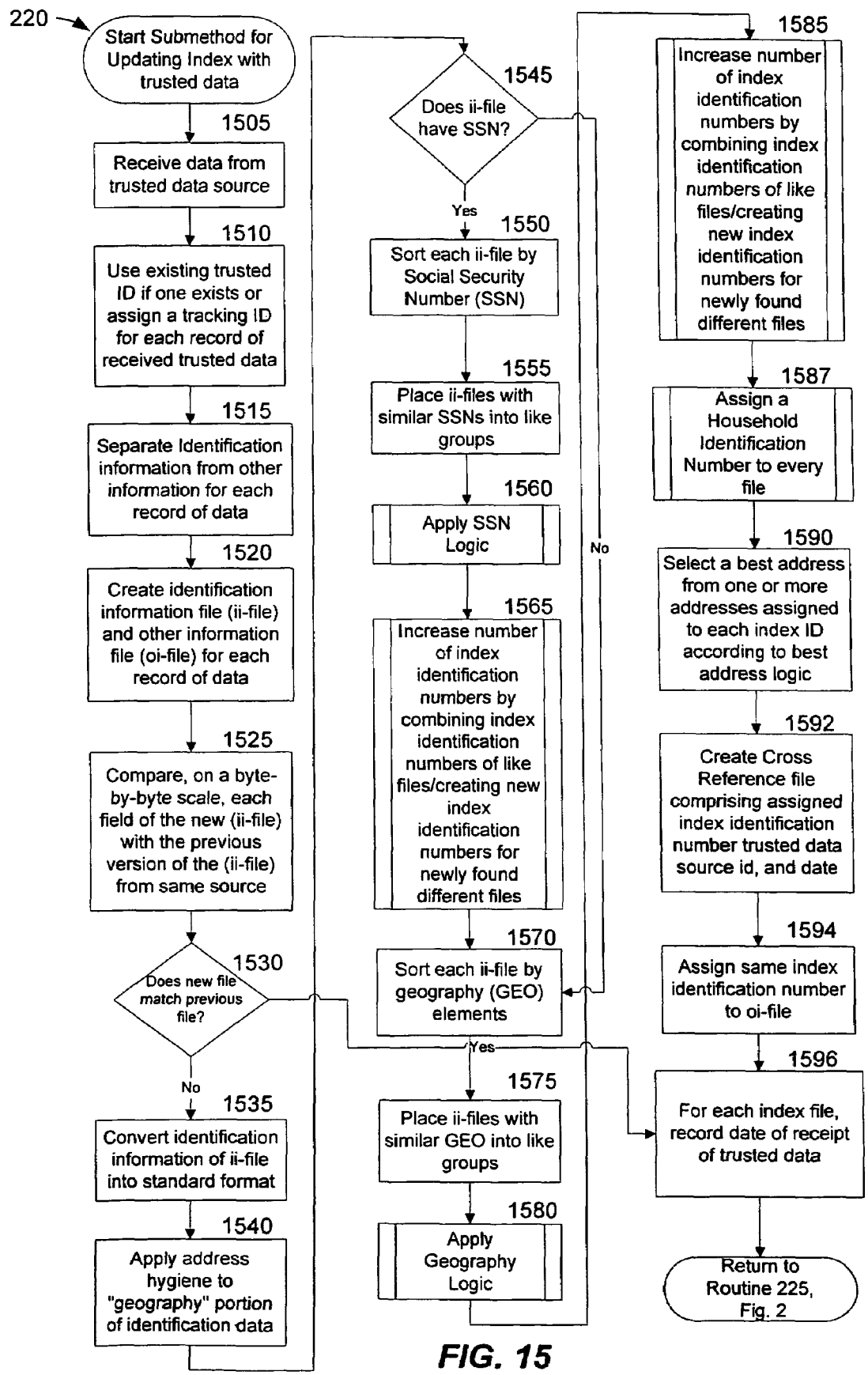
FIG. 15 is a logic flow diagram illustrating an exemplary subprocess for updating the index with trusted data according to one exemplary embodiment of the present invention.

Referring now to FIG. 15, this figure illustrates an exemplary routine or submethod 220 for updating the index 106 with trusted data. The submethod or routine 220 starts with step 1505. In step 1505, data is received from a trusted data source such a credit bureau. Next, in step 1510, a trusted data source ID is identified for each record of the trusted data. As noted above, according to one exemplary embodiment, the trusted data source ID can comprise identification numbers assigned by credit bureaus such as Equifax, Experian, and TransUnion. If a trusted data source ID is not present for the received data, then a tracking ID is assigned to the data.

In step 1515, the identification information is separated from other information for each record of data received from the trusted data source. Other information can comprise any information other than name, address, Social Security Number, and other contact information. Other information can comprise, but is not limited to, credit history, demographics, and other like information. Also, as noted above, this step illustrates the compliance of the present invention with the Truth in Lending Act, as well as the Fair Credit Reporting Act, which require that credit data as well other information that may prejudice judgment in business offers be separated from identification information during sorting and matching processes.

In step 1520, identification information files and other information files are created for each record of data received from the trusted data source. In step 1525, on a byte-by-byte scale, fields of the newly-created identification information files are compared with the previous version of the identification information file from the same source. One objective of step 1525 is to increase the speed of the process by identifying files that have already been added to the index in previous updates.

In decision step 1530, it is determined whether the new identification information file matches the previous identification information file. If the inquiry to decision step 1530 is positive, then the "yes" branch is followed to step 1596. If the inquiry to decision step 1530 is negative, then the "no" branch is followed to step 1535, in which the identification information of the newly-created identification information file is converted into a standard format that is used with the identification information files of the index 106.

In step 1540, address hygiene is applied to the geography portion of the identification information of the newly-created identification information file. In decision step 1545, it is determined whether the newly-created identification information file has a Social Security Number. If the inquiry to decision step 1545 is negative, then the "no" branch is followed to step 1570. If the inquiry to decision step 1545 is positive, then the "yes" branch is followed to step 1550, in which each identification information file is sorted according to its Social Security Number.

Next, in step 1555, identification information files having the same Social Security Numbers are placed into like groups. In routine 1560, the Social Security Number logic is applied to the groups of identification information files. Further details of routine 1560 are discussed above with respect to FIG. 5. It is noted that routine 1560 is the same routine 350 as discussed above.

Next, in routine 1565, index identification numbers 112 are assigned to each identification information file that has been identified as the same individual by the Social Security Number logic. It is also noted that routine 1565 is also similar to step 355 of FIG. 3.

In step 1570, each identification information file is sorted by its geography elements. Specifically, the identification information files are sorted according to geography information which can comprise street names, zip codes, and other like information.

In step 1575, identification information files with similar geography elements are placed into like groups. In routine 1580, geography logic is applied to the identification information files grouped according to their geography elements. Further details of routine 1580 are discussed above with respect to FIG. 7. That is, routine 1580 and routine 370 of FIG. 3 are the same process.

Next, in routine 1585, the number of index identification numbers is increased by combining index identification numbers of like files or by creating new index identification numbers from newly-found different files. Further details of routine 1585 are discussed above with respect to FIG. 8. It is noted that routine 1585 is the same routine as routine 365, illustrated in FIG. 3.

In step 1587, a household identification number is assigned to every identification information file. Further details of routine 1587 have been discussed above with respect to FIG. 8. It is noted that routine 1587 is the same as routine 380 discussed above, with reference to FIG. 3.

In routine 1590, the address data contained in the index 106 is ranked according to the best address logic. Routine 1590 is also the same as routine 385, as discussed above with reference to FIG. 3.

In step 1592, the cross-reference file 115 is created comprising the assigned index identification number 112, a trusted data source ID, and a date. Step 1592 is also the same as step 390 discussed above with reference to FIG. 3.

In step 1594, for each identification information file, the same index identification number 112 is assigned to a corresponding other information file. This step is also the same as step 395 as discussed above with reference to FIG. 3.

In step 1596, the current date of receipt for the trusted data is recorded in the index 106 for the identification information files that have been updated or changed. This date can be used in the Best Address process to select an address. The process then returns to routine 225 of FIG. 2.

Figure 16:
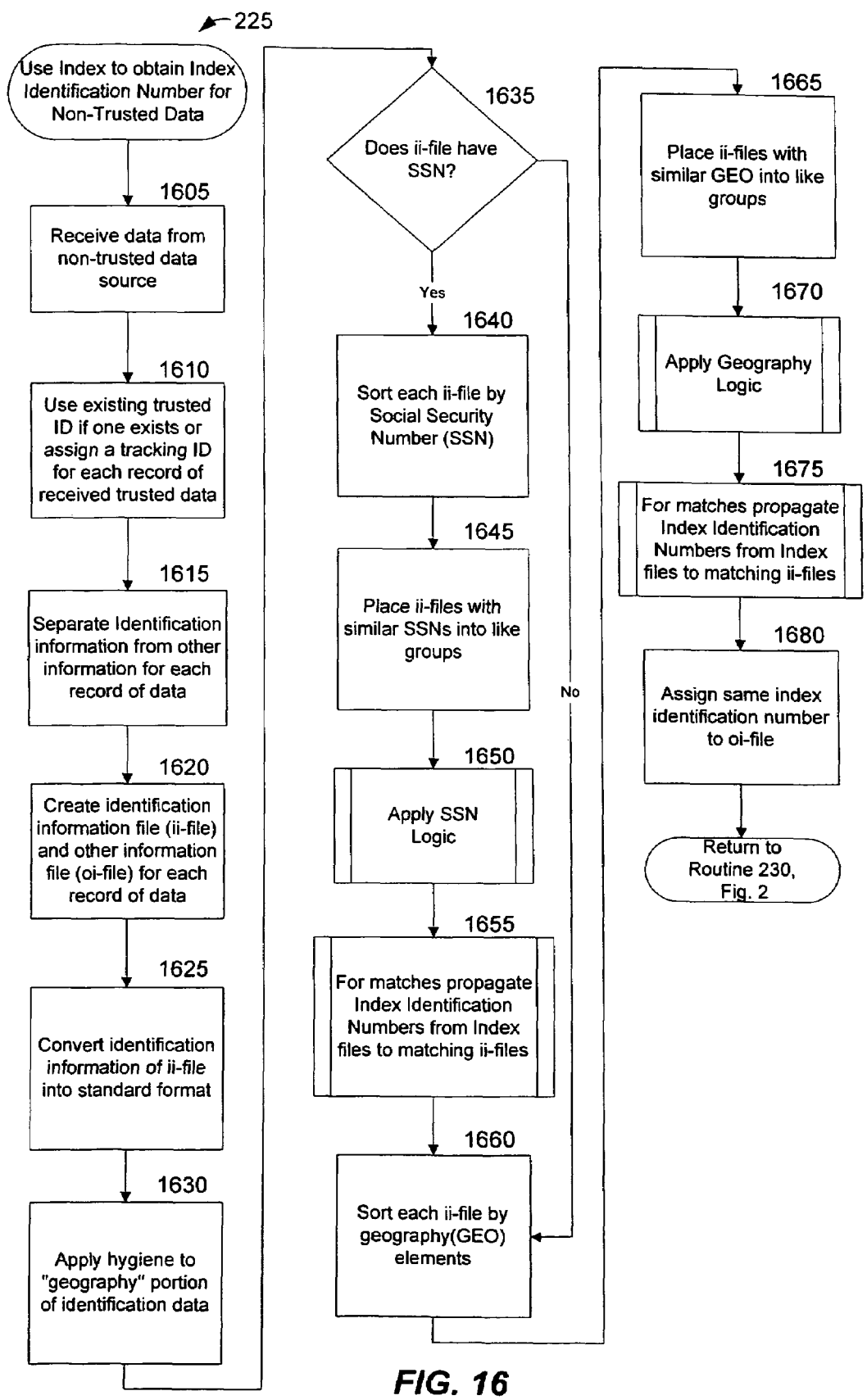
FIG. 16 is a logic flow diagram illustrating an exemplary subprocess or routine for using the index to obtain an index identification number for non-trusted data according to one exemplary embodiment of the present invention.

Referring now to FIG. 16, this figure illustrates a sub-method or routine 225 for using the index 106 to obtain an index identification number 112 for non-trusted data. Sub-method or routine 225 starts with step 1605, in which data is received from a non-trusted data source. An example of a non-trusted data source is, but is not limited to, a data received from a source other than a credit bureau or the National Change of Address Information database.

Next, in step 1610, a non-trusted data source ID is ascertained from each record of data received from the non-trusted data source. In step 1615, the identification information is separated from other information for each record of data. As mentioned above, the identification information can comprise name, address information, and Social Security Number information. However, other identification information is not beyond the scope of the present invention. And the other information can comprise credit history information as well as any other information that can be perceived to give or provide a bias during the matching logic of the present invention.

In step 1620, an identification information file and other information file are created for each record of non-trusted data. In step 1625, the identification information of the identification information file is converted into a standard format. Next, in step 1630, address hygiene is applied to the geography portion of the identification data.

In decision step 1635, it is determined whether the identification information file has a Social Security Number. If the inquiry to decision step 1635 is negative, then the "no" branch is followed to step 1660. If the inquiry to decision step 1635 is positive, then the "yes" branch is followed to step 1640, in which each identification information file is sorted by its Social Security Number.

In step 1645, identification information files with similar Social Security Numbers are placed into like groups. Next, in routine 1650, Social Security Number logic is applied to the clips of identification information files having like Social Security Numbers. Further details of routine 1650 have been discussed above with respect to FIG. 5. It is noted that routine 1650 is the same as routine 350 as discussed above, with reference to FIG. 3.

Next, in routine 1655, for identification information files that match the Social Security Number rules, index identification numbers 112 are copied from the index to the matching identification information files.

In step 1660, the identification information files of the index 106 are sorted according to their geography elements. The geography elements for information can comprise street names and zip codes, and other like information.

In step 1665, identification information files with similar geography elements are placed into like groups. In routine 1670, geography logic is applied to the like groups of identification information files. Further details of routine 1670 have been discussed above with respect to FIG. 7. Routine 1670 is the same as routine 370, discussed above with reference to FIG. 3.

In routine 1675, for identification information files that match the geography rules, index identification numbers 112 are copied to existing matching identification information files.

In step 1680, the other information files corresponding to the identification information files are located and assigned the same index identification number 112. The process then returns to routine 230 of FIG. 2.

Referring now to FIG. 17, this figure illustrates a sub-method or routine 230 of FIG. 2 for using the index cross reference file 116 to obtain index identification numbers 112 without performing a standard update process. Step 1705 is the first step of routine 230. In step 1705, a trusted data source I.D. from an identification information file is compared to the cross reference file 116. If a matching file is found in the cross reference file 116, the corresponding index identification number 112 from the Cross Reference file is copied to the trusted data file. Routine 230 is typically used for trusted data files so that the extensive update process can be avoided when information exists in the index 106 that already corresponds with a trusted data record. The process then returns to decision step 235 of FIG. 2.

Referring now to FIG. 18, this figure illustrates a sub-method or routine 250 of FIG. 2 for selecting the best address for identification information files in the index 106. Step 1805 is the first step of routine 250 in which the identification information files are sorted by their index identification numbers 112. Next, in step 1810, an address is selected from each identification information file at random or according to a preference in the existing ranking of the multiple addresses associated with each identification information file.

In step 1815, a new table is created in the index 106 comprising a listing of index identification numbers, and their associated names, social security numbers, and geography elements. The process then returns to step 255 of FIG. 2.

With the present invention, multiple files can be collected and maintained for each person that is tracked in the index 106. The index 106 of the present invention comprises multiple files on individuals that are consistent and persistent, irrespective of the type of data used to update the index 106 and the frequency at which the index 106 is updated by new data. The index 106 of the present invention stores files on a single individual that may include information that varies slightly from file to file. The present invention does not view two files of similar but not identical data as duplicates: the invention perceives them as separate files and can be designed to retain both files. Both files can be assigned the same index identification number 112 in order to create a link or relationship between the files that corresponds to a single individual being tracked.

The present invention reduces any difficulty in tracking individuals over time where such difficulty can arise when information on an individual changes. The present invention also reduces any difficulty in tracking individuals accurately at set time intervals such as on a monthly basis. The present invention yields files on an individual that are consistent during the aforementioned set time intervals, unlike the conventional art.

For the present invention, if a change in information for an individual occurs, then files are updated in a controlled manner. Old data is saved or archived in case the new information is inaccurate or if it is merely additional information. The old data is also saved for history purposes such that the evolution of files on an individual can be monitored, if necessary.

With the present invention, addresses are ranked according to the results of comparisons with different data such as social security numbers, national change of address (NCOA) data; return address information (deliverability), and the source of the address. After ranking multiple addresses, a single address can be selected for mailing a business product based on the addresses's ranking.

The present invention employs rules to social security numbers in order to accurately identify individuals corresponding to the social security numbers. These rules track slight inconsistencies in social security numbers in order to prevent the creation or maintenance of separate index identification numbers 112 for data that is really tracking or intended for one individual (and thus, one index identification number 112). The social security rules of the present invention are applied in a hierarchical manner meaning that they can be applied in a predetermined order and with a decreasing level matching criteria.

The application of these rules in this manner increases the efficiency at which two or more files containing similar but not identical social security numbers (that are tracking a single person) are assigned the same index identification number 112. The application of these rules in this manner separates files having the same index identification number 112 when the files really reflect that two or more individuals are being tracked.

The present invention increases the efficiency of assigning files tracking a single individual by applying a set of geographical rules in combination with the social security number rules. The geographical rules can include the selection of scores relating to a probability of matches between files with different geographical information. The application of the geographical rules increases the efficiency at which two or more files containing similar but not identical social security numbers or similar but not identical geographical information (that are tracking a single person) are assigned the same index identification number 112.

For the geographical logic of the present invention, the selection of the combination of rules and the selection of the scores within the rules increases the efficiency at which multiple files tracking a single individual are assigned a corresponding index identification number 112. Meanwhile, for the social security number logic, the actual elements making up the rules and the combination of the rules increases the efficiency at which multiple files tracking a single individual are assigned a corresponding index identification number 112.

With the index 106 of the present invention, business decisions can be made with ease for individuals being tracked in the database. In other words, the index 106 can allow a determination of whether an individual poses a risk for an offer to a business product. A business product can include, but is not limited to, firm offers of credit such as credit card offers and the like. Other business products can include, but are also not limited to, services, and actual products such as fungible goods. Alternatively, the index 106 can become the foundation for a relational database where various types of information, such as demographic information, can be tracked.

While the present invention is designed to assist in the decision making process for determining whether to make firm offers of credit to individuals, other applications of the index 106 are not beyond the scope of the present invention. Other applications of the index 106 of the present invention could include relational database inquiries that are accessed by businesses when interacting with individuals who are tracked in the index 106.

It should be understood that the foregoing relates only to illustrative embodiments of the present invention, and that numerous changes may be made therein without departing from the spirit and scope of the invention as defined by the following claims.

What is claimed is:

1. A computer implemented method for creating an index that tracks consumers, comprising:

maintaining a first set of data records in a data store, each record comprising identification information, geography information, and other information of a consumer, the identification information comprising a social security number;

using at least one computer processor, creating a first identification information index comprising the identification information and the geography information for each record of the first set of data records;

using an interface device coupled to said storage device, receiving a second set of data records from a trusted data source, each record comprising identification information, geography information, and other information of a consumer, the identification information comprising at least a social security number, the trusted data source comprising at least one of a government agency, a data aggregator and a credit reporting agency;

using the at least one computer processor, separating an identification information and a geography information from other information of a consumer for each record of the second set of data records;

using the at least one computer processor, creating a second identification information index comprising the identification information and the geography information for each record of the second set of data records;

using the at least one computer processor, sorting each set of data records in said second identification information index by social security number;

using the at least one computer processor, placing sets of data records in said second identification information index with similar social security numbers into groups;

and using the at least one computer processor, applying one or more social security number based rules to the groups without user intervention to determine whether one or more information index and a record from the second set of data records relate to a single consumer.

2. The method of claim 1, further comprising using the at least one computer processor, converting each identification information index into a standard format.

3. The method of claim 1, further comprising using the at least one computer processor, applying address hygiene to the geography information of each identification information index.

4. The method of claim 1, wherein applying social security number based rules comprises:

comparing social security numbers and geography information of the first identification information index with the second set of data records to determine if there are any matches between the first identification information index and the second set of data records.

5. The method of claim 1, further comprising using the at least one computer processor, assigning index identification numbers sequentially to the one or more identification information indices and a record of the second set of data that have been identified as a single consumer by the social security number based rules.

6. The method of claim 1, further comprising using the at least one computer processor, placing data records with similar geographical information into groups.

7. The method of claim 6, further comprising using the at least one computer processor, applying geography based rules to determine if one or more information indices and a record from the second set of data records relate to a single consumer.

8. The method of claim 1, further comprising using the at least one computer processor, creating another information index comprising information other than the identification information and geography information for each record of the second set of data records.

9. A computer implemented method for creating an index that tracks consumers, comprising:

maintaining a first set of data records in a data store, each record comprising identification information, geography information, and other information of a consumer, the identification information comprising a social security number;

using at least one computer processor, creating a first identification information index comprising the identification information and the geography information for each record of the first set of data records;

using an interface device coupled to said storage device, receiving a second set of data records from a trusted data source, each record comprising identification information, geography information, and other information of a consumer, the identification information comprising at least a social security number, the trusted data source comprising at least one of a government agency, a data aggregator and a credit reporting agency;

using the at least one computer processor, separating an identification information and a geography information from information other than the identification information and geography information for each record of the second set of data records;

using the at least one computer processor, creating a second identification information index comprising the identification information and the geography information for each record of the second set of data records;

using the at least one computer processor, placing sets of data records in said second identification information index with similar geographical information into groups;

and using the at least one computer processor, applying one or more geography based rules to the groups without user intervention to determine whether one or more information index and a record from the second set of data records relate to a single consumer.

10. The method of claim 9, wherein applying geography based rules comprises: comparing geography information of the first identification information index with the second set of data records to determine if there are any matches between the first identification information files and the second set of data records.

11. The method of claim 9, further comprising using the at least one computer processor, sorting each set of data records in said second identification information index by social security number.

12. The method of claim 9, further comprising using the at least one computer processor, placing sets of data records in said second identification information index with similar social security numbers into groups.

13. The method of claim 9, further comprising using the at least one computer processor, applying social security number based rules to determine if one or more information index and a record from the second set of data records relate to a single consumer.

14. The method of claim 13, wherein applying social security number based rules comprises: comparing social security numbers and geography information of the first identification information index with the second set of data records to determine if there are any matches between the first identification information index and the second set of data records.

15. The method of claim 9, further comprising using the at least one computer processor, converting each identification information index into a standard format.

16. The method of claim 9, further comprising using the at least one computer processor, applying address hygiene to the geography information of each identification information index.

17. The method of claim 9, further comprising using the at least one computer processor, assigning index identification numbers sequentially to the one or more identification information indices and record of the second set of data that have been identified as a single consumer by the geography based rules.

18. The method of claim 9, further comprising using the at least one computer processor, creating another information index comprising information other than the identification information and geography information for each record of the second set of records.

19. A system for creating an index that tracks consumers, comprising:
- a storage device for maintaining a first set of data records in a data store, each record comprising identification information, geography information, and other information of a consumer, the identification information comprising a social security number;
- an interface device coupled to said storage device for receiving a second set of data records from a trusted data source, each record comprising identification information, geography information, and other information of a consumer, the identification information comprising at least a social security number, the trusted data source comprising at least one of a government agency, data aggregator and a credit reporting agency;
- a processor coupled to said storage device operable to create a first identification information index comprising the identification information and the geography information for each record of the first set of data records;
- said processor being further operable to separate identification information and geography information from information other than the identification information and geography information for each record of the second set of data records;
- said processor being further operable to create a second identification information index comprising the identification information and the geography information for each record of the second set of data records;
- said processor being further operable to place sets of data records in said second identification information index with similar geographical information into groups;
- and said processor being further operable to apply one or more geography based rules to the groups without user intervention to determine whether one or more information index and a record from the second set of data records relate to a single consumer.

20. A system for creating an index that tracks consumers, comprising:
- a storage device for maintaining a first set of data records in a data store, each record comprising identification information, geography information, and other information of a consumer, the identification information comprising a social security number;
- an interface device coupled to said storage device for receiving a second set of data records from a trusted data source, each record comprising identification information, geography information, and other information of a consumer, the identification information comprising at least a social security number, the trusted data source comprising at least one of a government agency, a data aggregator and a credit reporting agency;
- at least one computer processor coupled to said storage and said interface device; and
- a computer-readable media comprising code that, when executed by the at least one computer processor, performs to perform the steps of:
    - creating a first identification information index comprising the identification information and the geography information for each record of the first set of data records;
    - separating an identification information and a geography information from other information of a consumer for each record of the second set of data records;
    - creating a second identification information index comprising the identification information and the geography information for each record of the second set of data records;
    - sorting each set of data records in said second identification information index by social security number;
    - placing sets of data records in said second identification information index with similar social security numbers into groups; and
    - applying one or more social security number based rules to the groups without user intervention to determine whether one or more information index and a record from the second set of data records relate to a single consumer.

* * * * *